United States Patent
Corbett et al.

(10) Patent No.: US 11,714,415 B2
(45) Date of Patent: *Aug. 1, 2023

(54) VIRTUAL GEARING IN AN AUTONOMOUS ELECTRONIC BICYCLE

(71) Applicant: Weel Autonomy Inc., Walnut, CA (US)

(72) Inventors: Justin Allan Corbett, Bothell, WA (US); David Carlyle Hansen, Mercer Island, WA (US)

(73) Assignee: WEEL AUTONOMY INC., Walnut, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/591,841

(22) Filed: Feb. 3, 2022

(65) Prior Publication Data

US 2022/0155787 A1 May 19, 2022

Related U.S. Application Data

(63) Continuation of application No. 16/935,060, filed on Jul. 21, 2020, now Pat. No. 11,281,223, which is a continuation of application No. 16/453,004, filed on Jun. 26, 2019, now Pat. No. 10,754,340.

(51) Int. Cl.
*G05D 1/02* (2020.01)
*G05D 1/00* (2006.01)

(52) U.S. Cl.
CPC ......... *G05D 1/0212* (2013.01); *G05D 1/0088* (2013.01); *G05D 2201/02* (2013.01)

(58) Field of Classification Search
CPC . G05D 1/0212; G05D 1/0088; G05D 2201/02
See application file for complete search history.

(56) References Cited

U.S. PATENT DOCUMENTS

| | | | |
|---|---|---|---|
| 4,221,275 | A | 9/1980 | Pennebaker et al. |
| 5,865,267 | A | 2/1999 | Mayer et al. |
| 6,150,794 | A | 11/2000 | Yamada et al. |
| 6,269,898 | B1 | 8/2001 | Mayer et al. |
| 7,156,780 | B1 | 1/2007 | Fuchs et al. |
| 8,430,192 | B2 | 4/2013 | Gillett |

(Continued)

OTHER PUBLICATIONS

United States Office Action, U.S. Appl. No. 16/453,009, dated Jan. 6, 2022, 16 pages.

(Continued)

*Primary Examiner* — James M Dolak
*Assistant Examiner* — James J Triggs
(74) *Attorney, Agent, or Firm* — Fenwick & West LLP

(57) ABSTRACT

An autonomous electronic bicycle comprises a frame, a wheel that can be powered by a first electronic motor, and a pedal assembly connected to a pedal motor. The pedal assembly is not mechanically connected to the wheel, but the autonomous electronic bicycle simulates a mechanical connection by powering the rear wheel proportional to the user's pedaling force. The autonomous electronic bicycle uses a virtual gear ratio based on the cadence of the rider, the current incline of the bicycle, and the current speed of the bicycle. The virtual gear ratio can be a ratio between a torque of the set of pedals and a torque of the wheel.

20 Claims, 15 Drawing Sheets

(56) References Cited

U.S. PATENT DOCUMENTS

| | | | |
|---|---|---|---|
| 8,772,225 | B2 | 7/2014 | Somers et al. |
| 8,851,499 | B1 | 10/2014 | Thompson |
| 9,266,574 | B1 | 2/2016 | Lippman et al. |
| 9,285,230 | B1 | 3/2016 | Silver et al. |
| 9,310,808 | B2 | 4/2016 | Shankwitz et al. |
| 10,245,937 | B2 | 4/2019 | Gillett |
| 10,754,340 | B1 | 8/2020 | Corbett |
| 11,281,223 | B2 * | 3/2022 | Corbett ............... G05D 1/0212 |
| 2003/0022743 | A1 | 1/2003 | Meggiolan |
| 2003/0216201 | A1 | 11/2003 | Takeda |
| 2010/0206652 | A1 | 8/2010 | Kielland |
| 2015/0019064 | A1 | 1/2015 | Shin |
| 2016/0070269 | A1 | 3/2016 | Kamen et al. |
| 2017/0190335 | A1 | 7/2017 | Gillett |
| 2017/0316333 | A1 | 11/2017 | Levinson et al. |
| 2018/0335521 | A1 | 11/2018 | Coddington |
| 2019/0176930 | A1 | 6/2019 | Wiegel et al. |
| 2019/0178679 | A1 | 6/2019 | Woolley |
| 2019/0250619 | A1 | 8/2019 | Gillett |
| 2019/0308512 | A1 | 10/2019 | Hasumi |
| 2019/0310100 | A1 | 10/2019 | Yang |
| 2019/0376805 | A1 | 12/2019 | Whitt et al. |
| 2019/0384994 | A1 | 12/2019 | Frossard et al. |
| 2020/0035099 | A1 | 1/2020 | Sivakumar et al. |
| 2020/0201336 | A1 | 6/2020 | Myers et al. |
| 2020/0378777 | A1 | 12/2020 | Canella et al. |
| 2020/0386556 | A1 | 12/2020 | Rolf et al. |
| 2020/0398923 | A1 | 12/2020 | Griffith et al. |
| 2020/0409381 | A1 | 12/2020 | Corbett et al. |
| 2021/0139103 | A1 † | 5/2021 | Gillett |
| 2021/0141386 | A1 | 5/2021 | Eshima |
| 2022/0017121 | A1 | 1/2022 | McLean et al. |
| 2022/0227455 | A1 | 7/2022 | Corbett et al. |

OTHER PUBLICATIONS

United States Office Action, U.S. Appl. No. 16/453,009, dated Sep. 10, 2021, 18 pages.

Hollingshead, T., "BYU Traffic Study: No More Left Turns on Busy Streets," Brigham Young University Communications, Jun. 19, 2018, 4 pages, [Online] [Retrieved Apr. 11, 2022], Retrieved from the Internet <URL:https://news.byu.edu/news/byu-traffic-study-no-more-lefl-turns-busy-streets>.

United States Office Action, U.S. Appl. No. 16/935,060, dated Oct. 18, 2021, seven pages.

Third Party Submission under 37 CFR 1.290, Submitted by Carla R. Gillett for U.S. Appl. No. 17/006,555, filed Jul. 17, 2022, 39 pages.

Third Party Submission under 37 CFR 1.290, Submitted by Carla R. Gillett for U.S. Appl. No. 17/006,528, filed Jul. 7, 2022, 33 pages.

Third Party Submission under 37 CFR 1.290, Submitted by Carla R. Gillett for U.S. Appl. No. 17/006,555, filed Jul. 7, 2022, 30 pages.

Third Party Submission under 37 CFR 1.290, Submitted by Carla R. Gillett for U.S. Appl. No. 17/591,841, filed Jul. 6, 2022, 51 pages.

United States Office Action, U.S. Appl. No. 16/453,009, dated Jun. 2, 2022, 17 pages.

United States Office Action, U.S. Appl. No. 16/453,001, dated Jul. 6, 2022, 12 pages.

United States Office Action, U.S. Appl. No. 16/453,009, dated Dec. 7, 2022, 16 pages.

* cited by examiner
† cited by third party

VIRTUAL GEARING IN AN AUTONOMOUS ELECTRONIC BICYCLE

CROSS REFERENCE TO RELATED APPLICATIONS

This application is a continuation of U.S. application Ser. No. 16/935,060, filed Jul. 21, 2020, which is a continuation of U.S. application Ser. No. 16/453,004, filed Jun. 26, 2019, now U.S. Pat. No. 10,754,340, all of which is incorporated by reference in their entirety.

BACKGROUND

This disclosure relates generally to autonomous vehicles and more specifically to autonomous bicycle systems.

Many users have a need for on demand short distance transportation, for example for traveling between destinations within a city center when the user does not have transportation of their own. Currently, each available solution is either inconvenient or inflexible in providing this type of transportation service to a user. For example, traditional public transportation (such as buses and subway systems) may not provide service from the user's current location or to the desired destination. Similarly, taxi or rideshare services can be relatively expensive for short trips, can get stuck in traffic, and, because they are operated by a driver, remove the user's agency in choosing the route. Finally, public "bikeshare" services require either saturating the entire service area with many static pickup points (or large numbers of vehicles) at large expense, or risk being unavailable at the user's current position. Therefore, a solution is needed to provide convenient, on-demand transportation to users without requiring the expense and loss of agency inherent in taxi or rideshare services.

Figure 1:
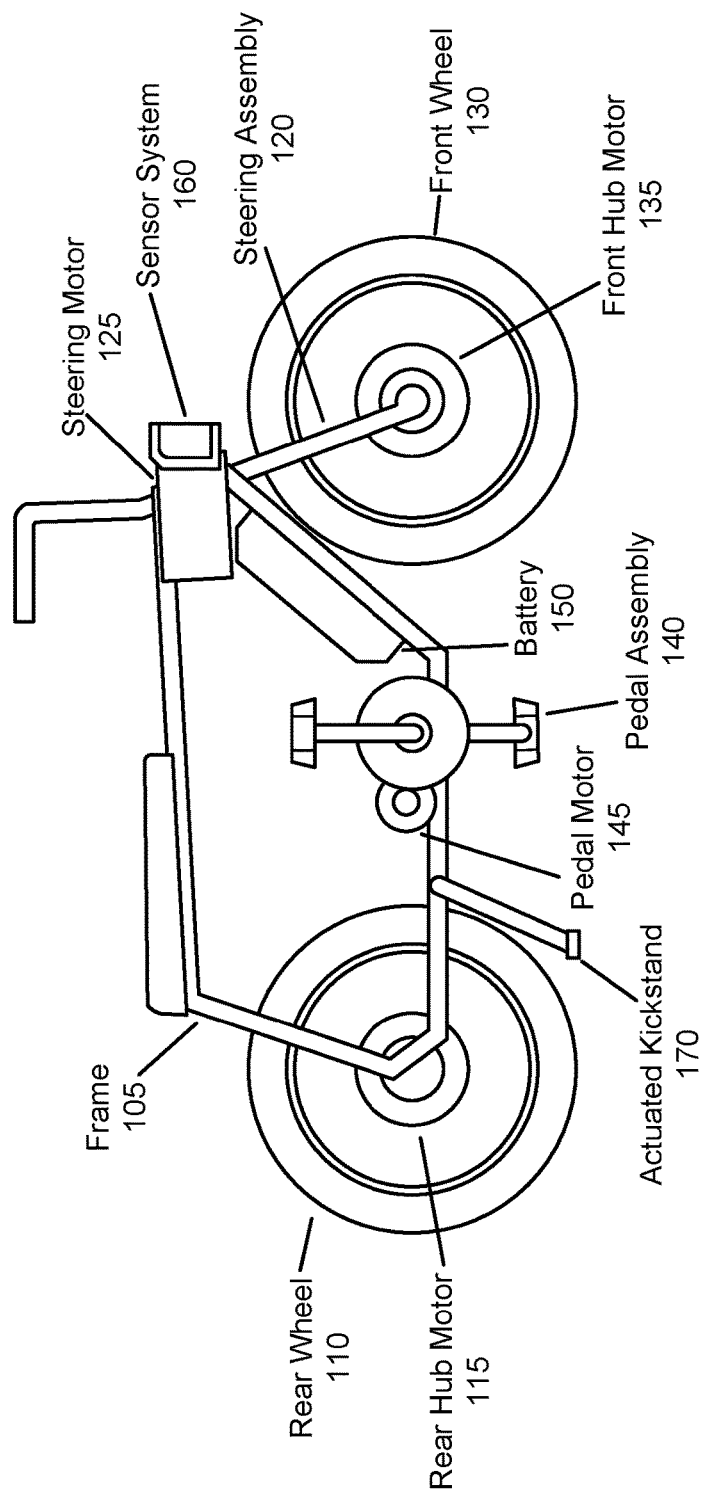
FIG. 1 illustrates example hardware components of an example autonomous electronic bicycle, in accordance with an embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Overview

To provide a convenient transportation solution, an autonomous electronic bicycle system can provide bicycles on demand to a plurality of riders in a service area. The autonomous electronic bicycle (or "AEB") system can operate using a plurality of autonomous electronic bicycles which can autonomously deliver themselves to a requesting rider. After the autonomous electronic bicycle reaches the requesting rider, the rider can mount the bicycle and manually pedal and ride to their ultimate destination. An autonomous electronic bicycle system provides the advantages of convenience to the rider due to reduced search time for an available vehicle, and requires proportionally less vehicles to cover a given service area, as the autonomous electronic bicycles can reposition themselves as needed to provide optimal coverage. In some embodiments, potential riders can request an autonomous electronic bicycle using an application on a mobile device of the user. When a rider requests an autonomous electronic bicycle, the AEB system can dispatch one or more autonomous electronic bicycles towards a location provided by the user.

Electronic Bicycle Hardware

An electronic bicycle can be any bicycle in which some or all torque provided to the rear wheel is provided by an electronic motor (or similar propulsion system). When operated by a rider, the output torque can be proportional to an input power exerted by the rider on pedals of the electronic bicycle (e.g., based on a signal produced by pedals representative of a cadence of pedaling, a speed of pedaling, or a strength of pedaling by the rider). In some embodiments, an autonomous electronic bicycle is an autonomous two-wheeled vehicle capable of operating autonomously without a rider. However, an autonomous electronic bicycle can be ridden by a rider as a traditional (non-autonomous) bicycle with or without electronic assistance, according to some embodiments. In some implementations, an autonomous electronic bicycle is "autonomous capable," that is, able to operate both in "autonomous mode" without a rider or direct rider control and in "manual mode" with direct input from a human rider. For example, the autonomous electronic bicycle can autonomously navigate to a chosen destination where a rider is waiting. On arrival, the rider can place the autonomous electronic bicycle in manual mode and use it as a traditional bicycle. In some implementations, an autonomous electronic bicycle is a bicycle with two wheels, though an autonomous electronic bicycle can be any vehicle requiring lateral balance while in operation, such as a unicycle, recumbent bicycle, motorcycle, moped, or motor scooter.

FIG. 1 illustrates example hardware components of an example autonomous electronic bicycle, in accordance with an embodiment. The autonomous electronic bicycle 100 of FIG. 1 comprises a frame 105, rear wheel 110, rear hub motor 115, steering assembly 120, steering motor 125, front wheel 130, front hub motor 135, pedal assembly 140, pedal motor 145, battery 150, sensor system 160, and kickstand 170.

The frame 105 of the autonomous electronic bicycle 100 can provide a base, platform, or frame for one or more components of the autonomous electronic bicycle 100 to attach to. In some embodiments, the frame 105 comprises a seat (or one or more seats) that can accommodate one or more riders of the autonomous electronic bicycle 100. The frame 105 can be made of aluminum, steel, carbon fiber, or any other suitable material or combination of materials formed by any suitable method.

In the embodiment of FIG. 1, the frame 105 comprises an attachment for the rear wheel 110 of the autonomous electronic bicycle 100. The rear wheel 110 can be made of any suitable materials, may be pneumatic, solid, or of any other suitable type, and can comprise a tire to provide traction on the ground surface. The rear wheel 110 is powered by the rear hub motor 115, which can be integrated into the hub or axle of the rear wheel 110. The rear hub motor 115 can be used to propel the autonomous electronic bicycle in a forward or reverse direction and/or to aid in balancing the autonomous electronic bicycle 100. The rear hub motor 115 can comprise one or more electric motors and can be geared or ungeared and use any suitable electronic motor technology, for example, the rear hub motor 115 can be a brushed or brushless DC motor, an AC motor, or of any other suitable type. In some implementations, the use of different types of electric motors can affect the final performance of the rear hub motor 115. For example, using an ungeared (or relatively ungeared) motor can allow the autonomous electronic bicycle 100 to better control the power applied through the rear hub motor 115, for example through the elimination of mechanical lash in the gearbox of a geared motor. However, ungeared motors may be less energy efficient than an equivalent geared motor.

In some embodiments, the rear hub motor 115 is additionally used to provide braking to the rear wheel 110. For example, the rear hub motor 115 use a regenerative braking system to return power to the battery 150 while providing braking force to the rear wheel 110. Similarly, the rear hub motor 115 can use a dynamic braking system, dissipating the excess energy to the frame, or, in emergency situations, through shorting the rear hub motor 115, according to some embodiments. Other embodiments of the rear wheel 110 can incorporate traditional mechanical brakes in place of or in addition to the use of the rear hub motor 115 as an electronic brake.

Further, in some embodiments, the rear hub motor 115 drives the rear hub of the rear wheel 110 without being integrated into the hub itself. For example, the rear hub motor 115 can drive the rear wheel 110 through a chain or belt drive (such as in a single gear traditional bicycle chain drive). In other embodiments, the rear hub motor 115 is integrated into the hub of the rear wheel 110, but the hub of the rear wheel 110 is also connected to the pedal assembly 140 through a chain or belt drive, for example, to allow a rider of the autonomous electronic bicycle 100 to provide mechanical power to the rear wheel 110 with or without the assistance of the rear hub motor 115 (such as in situations where the autonomous electronic bicycle 100 is manually operated by a rider.

The frame 105 can additionally be connected to a steering assembly 120, for example, a fork and handlebars enabling the front wheel 130 to be steered relative to the frame 105, in the embodiment of FIG. 1. In some implementations, the steering assembly 120 articulates relative to the frame 105 on one or more pivot points. The steering assembly 120 can be aluminum, steel, carbon fiber, or any other suitable material or combination of materials as described above. In some embodiments, the steering assembly 120 comprises handlebars or another suitable user control allowing a rider of the autonomous electronic bicycle 100 to control the steering angle of the front wheel 130 relative to the frame 105.

The steering assembly 120 can also be electronically controlled through the steering motor 125, which can articulate the steering assembly 120 (and therefore the front wheel 130) through a range of steering angles. The steering motor 125 can comprise one or more electric motors and can be geared or ungeared and use any suitable electronic motor technology, for example, the steering motor 125 can be a brushed or brushless DC motor, an AC motor, or of any other suitable type. In implementations where the autonomous electronic bicycle 100 is human-rideable, the steering motor 125 is configured to ensure that the steering assembly 120 remains a compliant actuator to user input. In some embodiments, the steering motor 125 is ungeared or minimally geared to minimize the drag provided to the steering assembly 120 when manually turned by a rider of the autonomous electronic bicycle 100. Similarly, the steering motor 125 can be intentionally oversized to improve low speed performance (as when turning the steering assembly 120) while ungeared. In some embodiments, the steering motor 125 is additionally used to actively damp the steering of the autonomous electronic bicycle 100 when ridden by a human rider. Similarly, some implementations use a "steer by wire" system for user control of the steering assembly 120. In a steer by wire implementation, the manual user controls for steering are not mechanically linked to the front wheel 130, so user steering input is measured and a proportional output is applied to the steering assembly 120 by the steering motor 125 to simulate a mechanical linkage.

The use of the steering motor 125 for active damping enables the steering assembly 120 to be optimized for autonomous operation while maintaining rideability for a human rider. For example, the head angle (the angle of the head tube of the frame 105) of the steering assembly 120 and frame 105 can be steepened to provide additional responsiveness when operating autonomously, however, the steering motor 125 can be manually used to damp the steering of the autonomous electronic bicycle 100, simulating a slacker (more stable) head angle for a human rider.

The front wheel 130, like the rear wheel 110, can be any suitable material, size, and tire type, however, the front wheel 130 may be a different sizes or width than rear wheel 110. In some embodiments, the front wheel 130 is powered by the front hub motor 135. Similar to the rear hub motor 115 and the steering motor 125, the front hub motor 135 can comprise one or more electric motors and can be geared or ungeared and use any suitable electronic motor technology, for example, the front hub motor 135 can be a brushed or brushless DC motor, an AC motor, or of any other suitable type. In some embodiments, the front hub motor 135 and the steering motor 125 are the primary inputs used to control the balance of the autonomous electronic bicycle 100. Therefore, a responsive motor (such as an ungeared brushless DC motor) can be used for the front hub motor 135 to enable the autonomous electronic bicycle 100 to make fine adjustments to its balance/lean angle. Like the rear hub motor 115, the front hub motor 135 can be used for electronic braking as well (through dynamic braking, regenerative braking, or any suitable method as explained above), and/or the front wheel 130 may comprise a mechanical braking system.

The pedal assembly 140, according to some embodiments, allows a human rider of the autonomous electronic bicycle 100 to manually propel or otherwise provide power to the autonomous electronic bicycle 100. In some implementations, a virtual pedal system is used in which the pedal assembly 140 is not directly connected to the rear wheel 130 (e.g., via a chain). Instead, the pedal assembly 140 can be connected to the pedal motor 145, acting as a generator to provide which the user can pedal against while generating power for the autonomous electronic bicycle 100. The resulting electrical power from the user's pedaling can be stored or used to power (or partially power) the autonomous electronic bicycle 100. In some embodiments, the rider of the autonomous electronic bicycle 100 can additionally or alternatively control the speed of the autonomous electronic bicycle 100 through a throttle or other speed control input. In these cases, the autonomous electronic bicycle 100 may not have the pedal assembly 140 or pedal motor 145. The pedal motor 145 can additionally be used to manipulate the pedal assembly 140 when in autonomous mode, for example, to avoid striking the pedals on obstacles when passing by in autonomous mode. The virtual pedal system, including the use of the pedal motor 145 will be discussed in further detail below. In other embodiments, the pedal assembly 140 is connected mechanically to the rear wheel 130, for example with a chain or belt drive as described above.

The autonomous electronic bicycle 100 can comprise a battery 150 which can provide power to one or more components of the autonomous electronic bicycle 100, such as the front and rear hub motors 135 and 115 and the steering motor 125. The battery 150 can be a single battery or any suitable combination of batteries and/or other power storage devices (such as capacitors). In some embodiments, the battery 150 can send or receive power from one or more of the motors of the autonomous electronic bicycle 100, for example, from harvesting power from the pedal motor 145 (such, through the virtual pedal system), or from the rear wheel motor 115 through regenerative braking.

The autonomous electronic bicycle 100 can include a sensor system 160 including sensors capable of gathering information about the position of and environment around the autonomous electronic bicycle 100, for example, for use in autonomous mode. The sensor system 160 can include any suitable sensor or suite of sensors and, although the sensor system 160 is represented as a single unit in FIG. 1, the sensors of the sensor system 160 can be located at any suitable position on the autonomous electronic bicycle 100 either grouped together or distributed in any suitable manner. For example, the sensor system 160 can comprise GPS sensors, gyroscopes or other orientation sensors, accelerometers, IMUs (Inertial Measurement Units), magnetometers, motion detectors, pedal and motor position sensors, SLAM (Simultaneous Localization and Mapping) or VSLAM (Visual Simultaneous Localization and Mapping) systems, depth sensors, curb feelers, and any other suitable sensors, each configured to produce a signal representative of a characteristic of the bicycle (such as a location of the bicycle, a position or orientation of the bicycle, a surrounding of the bicycle, and the like).

In some implementations, the autonomous electronic bicycle 100 can include an actuated kickstand 170 which may enable the bike to stop and start in autonomous mode without falling over. For example, the actuated kickstand 170 can comprise a linear actuator or electronic motor used to extend and retract the kickstand depending on the current situation. For example, the autonomous electronic bicycle 100 can retract the kickstand 170 in response to transitioning (or preparing to transition) from a stop to movement and can extend the kickstand 170 in response to transitioning from movement to a stop. In other embodiments, the autonomous electronic bicycle can use a track stand (a stationary two-wheel balance) to stop (for example, when waiting for short lengths of time at an intersection). Similarly, the autonomous electronic bicycle 100 can comprise other systems the autonomous electronic bicycle 100 in locomotion or balance, for example, a center of gravity shift mechanism allowing the autonomous electronic bicycle 100 to actively change the center of gravity to aid in balancing.

Figure 2:
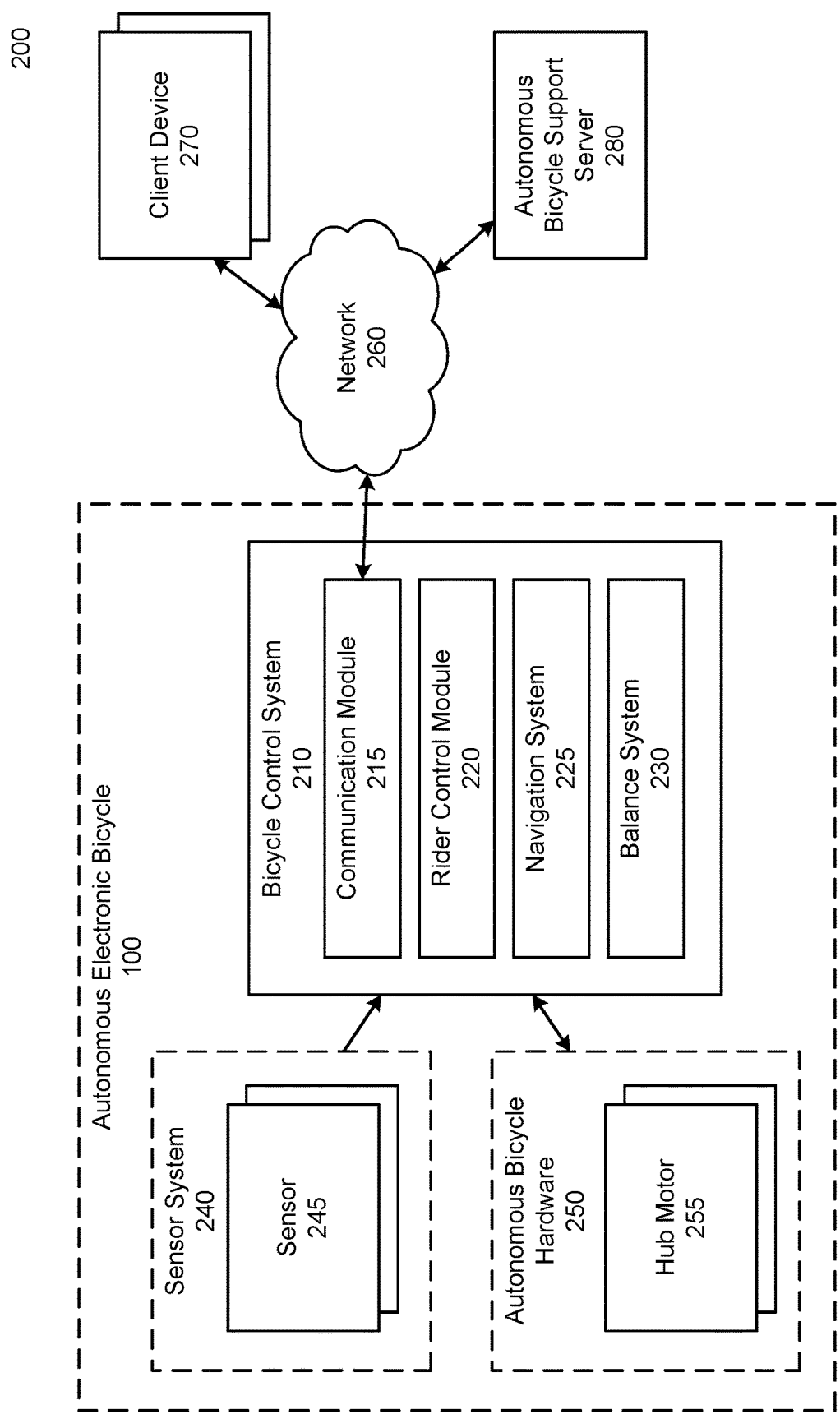
FIG. 2 is a block diagram of an environment in which an autonomous electronic bicycle operates, in accordance with an embodiment.

In some implementations, the autonomous electronic bicycle 100 is be controlled by a bicycle control system (or a controller or other processor of the bicycle) which can control one or more components of the autonomous electronic bicycle 100 based on input or signals from the sensor system 160, the pedal assembly 140, and/or communications with third parties or servers associated with the autonomous electronic bicycle 100. FIG. 2 is a block diagram of an environment in which an autonomous electronic bicycle operates, in accordance with an embodiment. The environment 200 of FIG. 2 comprises an autonomous electronic bicycle 205 communicatively connected one or more client devices 270 and the autonomous vehicle support server 280 over a network 260. In alternative configurations, different and/or additional components may be included in the environment 200.

The autonomous electronic bicycle can be an autonomous electronic bicycle 100 as illustrated in FIG. 1 or any other suitable autonomous vehicle. In the embodiment of FIG. 2, the autonomous electronic bicycle 100 comprises a bicycle control system 210, a sensor system 240 comprising one or more sensors 245, and autonomous bicycle hardware 250 comprising one or more electronically controllable systems of the autonomous electronic bicycle 100, such as the hub motor 255, but which can also include any suitable motor, battery, actuator, or other system controlled by the bicycle control system 210.

The bicycle control system 210 can be any computer system, microcontroller, processor, mobile device, electronic circuit or system, or other suitable computing component mounted on the autonomous electronic bicycle 100 capable of operating the autonomous electronic bicycle 100. In the embodiment of FIG. 2, the bicycle control system 210 comprises a communication module 215, a rider control module 220, a navigation system 225, and a balance system 230.

In some implementations, the communication module 215 facilitates communications of the bicycle control system 210 over the network 260 using any suitable communication protocol. For example, the bicycle control system 210 can communicate with one or more client device 270 over the network, for example to enable the autonomous electronic bicycle 100 to be controlled by a user of the client device 270, or for any other suitable reason. Similarly, the communication module 215 can communicate with the autonomous electronic bicycle support server 280 over the network 260. For example, the bicycle control system 210 can receive a destination for autonomous travel from the autonomous electronic bicycle support server 280. The network 260, client device 270, and the autonomous electronic bicycle support server 280 will be discussed further below.

The rider control module 220 can, in some embodiments, control functions of the autonomous electronic bicycle 100 used when the being autonomous electronic bicycle 100 is in manual mode. For example, the rider control module 220 can manipulate the autonomous bicycle hardware 250 to alter the handling characteristics of the autonomous electronic bicycle 100 to provide a better riding experience for a human rider. For example, the rider control module 220 can electronically damp rider steering inputs to simulate more stable riding characteristics than provided by the physical design of the autonomous electronic bicycle 100. For example, as described above, the steering motor 125 can be used to simulate a more stable steering response than natural based on the design of the autonomous electronic bicycle 100. Similarly, in implementations using steer by wire user steering controls, the rider control module 220 can magnify certain user steering inputs, or otherwise actively stabilize the autonomous electronic bicycle 100. Additionally, the rider control module 220 can power one or more of the front and rear hub motors 135 and 115 in response to user inputs to drive the autonomous electronic bicycle 100. For example, the rider control module 220 can output power proportional to a power output by a user through the pedal assembly 140 to one or more of the front and rear hub motors 135 and 115.

In some implementations, the navigation system 225 and balance system 230 are active when the autonomous electronic bicycle 100 and the rider control unit 220 is inactive while the autonomous electronic bicycle is in autonomous mode. Similarly, when the navigation system 225 and balance system 230 are inactive when the autonomous electronic bicycle is in manual mode. In some embodiments, the rider control unit 220 can be used to control the autonomous electronic bicycle 100 remotely while in autonomous mode. For example, the autonomous electronic bicycle 100 can be remotely controlled (in some embodiments, by a user connected to the autonomous bicycle support server 280) to perform maneuvers the autonomous electronic bicycle 100 cannot perform autonomously (such as unprotected left turns across traffic).

The navigation system 225 can, in some embodiments, select a target pose for the autonomous electronic bicycle 100 to achieve. As used herein a "pose" of the autonomous electronic bicycle 100 represents a state of the autonomous electronic bicycle 100 at a specific time. For example, a pose of the autonomous electronic bicycle 100 can include a position of the frame 105 in 4D space (that is, an XYZ coordinate position and a time), a heading of the autonomous electronic bicycle 100, a heading rate (i.e. the speed at which the autonomous electronic bicycle 100 is turning), a velocity and/or acceleration of the autonomous electronic bicycle 100, a lean angle of the autonomous electronic bicycle 100, and any other suitable information about the state of the autonomous electronic bicycle. A pose can also include a relative or absolute position and/or orientation of one or more additional components of the autonomous electronic bicycle 100, for example an orientation of the front wheel 130 relative to the frame 105, or an angle of rotation of the pedal assembly 140. According to some implementations, the pose of the autonomous electronic bicycle 100 is measured relative to a point on the frame 105, and therefore does not account for any moving parts of the autonomous electronic bicycle 100 such as the front wheel 130 and the steering assembly 120, which may be, in these embodiments, measured relative to the position and orientation of the frame 105. In some embodiments, the pose of the autonomous electronic bicycle 100 is measured from a known origin point, for example, a point on the frame 105 of the autonomous electronic bicycle 100 or an external reference point such as a location destination, an external object or location within the vicinity of the autonomous electronic bicycle 100, or the like. In some implementations, a pose of the autonomous electronic bicycle 100 can be represented as a quaternion. According to some embodiments, the target pose determined by the navigation system 225 comprises a target heading rate and target velocity of the autonomous electronic bicycle 100.

In some embodiments, the navigation system 225 can select a target pose for the autonomous electronic bicycle 100 based on a determined destination and route to the destination, such as where the destination is a target point and the route is as set of high level instructions to reach that point. For example, the destination can be a certain address and the route can be a series of streets and turns to follow when traveling to the address. In some implementations, the destination and/or the route is determined internally by the bicycle control system 210 or, in other implementations is provided by an external system. For example, the destination may be provided by a client device 270 or the autonomous electronic bicycle support server 280, and the route can be determined by the autonomous electronic bicycle support server 280 using a third-party service. The navigation system 225 will be discussed in further detail below.

The balance system 230 can, in some embodiments, take a target pose from the navigation system 225 and control the autonomous bicycle hardware 250 towards achieving the target pose while keeping the autonomous electronic bicycle 100 balanced. For example, the balance system 230 can set the output torque of one or more of the hub motors 115 and 135 and the steering motor 125 to move the autonomous electronic bicycle 100 through the target pose. The balance system 230 will be discussed further below. In some implementations, the balance system 230 can modify a received target pose from the navigation system 225 (or generate a new target pose) to maintain the balance of the autonomous electronic bicycle 100. For example, the navigation system 225 can alter the target pose based on the current pose, the current acceleration, or any other factor that may impact the balance of the autonomous electronic bicycle 100.

The network 260, which may comprise any combination of local area and/or wide area networks, using both wired and/or wireless communication systems. In one embodiment, the network 260 uses standard communications technologies and/or protocols. For example, the network 260 can include communication links using technologies such as Ethernet, 3G, 4G, CDMA, WIFI, and Bluetooth. Data exchanged over the network 260 may be represented using any suitable format, such as hypertext markup language (HTML) or extensible markup language (XML). In some embodiments, all or some of the communication links of the network 260 may be encrypted using any suitable technique or techniques.

Each client device 270 can be a computing device capable of receiving user input as well as transmitting and/or receiving data via the network 260. In some embodiments, a client device 270 is a device having computer functionality, such as a mobile telephone, a smartphone, or another suitable device. In one embodiment, a client device 270 executes an application or web application allowing a user of the client device 270 to interact with the autonomous electronic bicycle 100 or the autonomous bicycle support server 280. In another embodiment, a client device 270 interacts with the autonomous electronic bicycle 100 or the autonomous bicycle support server 280 through an application programming interface (API) running on a native operating system of the client device 270. In some implementations, a user of the client device 270 can request use of an autonomous electronic bicycle 100 through an app or website over the network 260. Similarly, the destination can be a location provided by a potential rider through a mobile application running on a client device 270. In some implementations, an autonomous electronic bicycle 100 then autonomously drives itself to (or near to) the user of the client device 270 or another specified destination in autonomous mode. The user of the client device 270 can then place the autonomous electronic bicycle 100 in manual mode and ride the autonomous electronic bicycle 100 as needed.

The autonomous electronic bicycle support server 280 can any suitable server, server cluster, or cloud based server capable of communication with and support of one or more autonomous electronic bicycles 100. In some embodiments, the autonomous electronic bicycle support server 280 can provide navigation instructions and/or route information. Similarly, the autonomous electronic bicycle support server 280 can provide object recognition processing or other functions of the navigation system 225 remotely, according to some embodiments. For example, when the additional lag introduced by sending data to the autonomous electronic bicycle support server 280 would not present safety concerns.

Rideable Autonomous Bicycle

As described above, the rider control module 220 can control a variety of functions of the autonomous electronic bicycle 100 when operating in manual mode. For example, the rider control module 220 can control the steering motor 125 to damp rider steering inputs while maintaining the feel of a compliant actuator. Similarly, the rider control module 220 can power one or more of the front and rear hub motors 135 and 115 proportional to a suitable user input. As described above, the autonomous electronic bicycle 100 can use a virtual pedal system in which the pedal assembly 140 is not mechanically connected to the rear wheel 110, but a connection is simulated using the rear hub motor 115 and the pedal motor 140 are used to simulate a connection between the pedal assembly 140 and the rear wheel 110. For example, rider control module 220 can provide power to the rear hub motor 115 proportional to the power input by the user into the pedal motor 140 (along with any other suitable factor). A virtual pedal system can result in an autonomous electronic bicycle 100 with reduced mechanical complexity relative to an autonomous electronic bicycle with a direct mechanical connection between the pedal assembly 140 and the rear wheel 110. Therefore, as the use of a virtual pedal system results in fewer moving parts and mechanical linkages to fail or require maintenance, and therefore relatively greater reliability.

Figure 3:
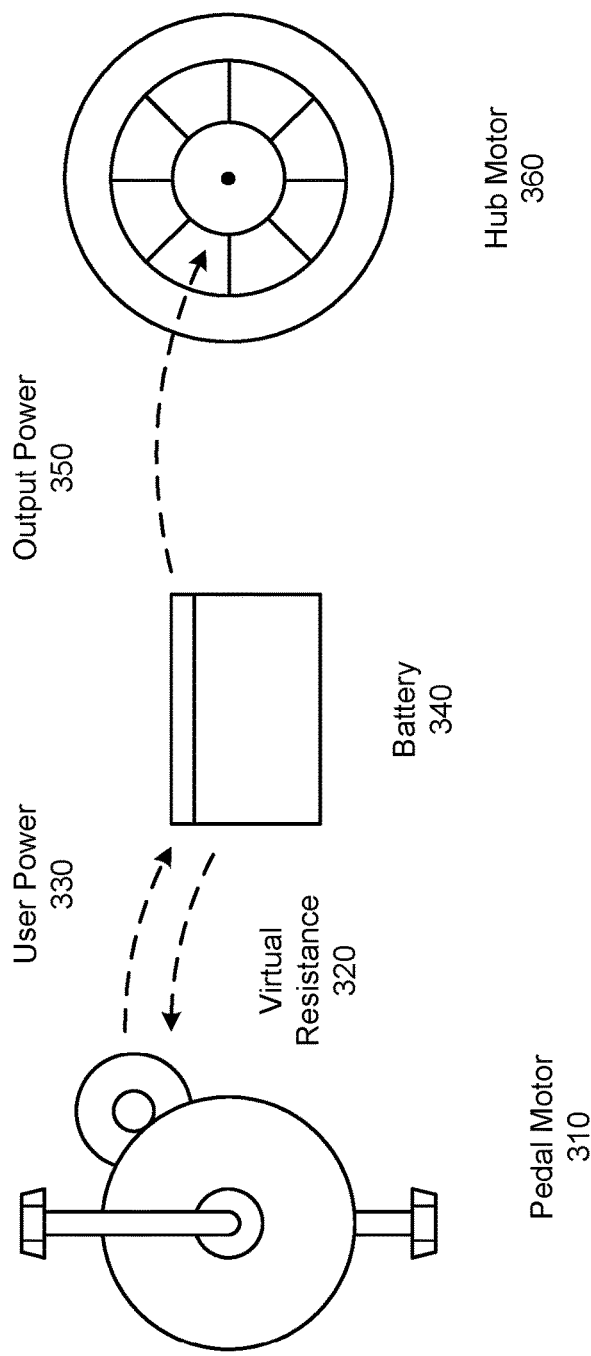
FIG. 3 illustrates a system for simulating a connection between a set of pedals and a motor of an electronic bicycle, in accordance with an embodiment.

FIG. 3 illustrates a system for simulating a connection between a set of pedals and a motor of an electronic bicycle, in accordance with an embodiment. The environment 300 of FIG. 3 can include a pedal motor 310 supplying a virtual resistance 320 (for example, controlled by current draw by a battery 340) and acting as a generator to supply user power 330 to the battery 340 in various embodiments. In turn, the battery 340 supplies a related output power 350 to a hub motor 360.

The pedal motor 310 can be configured to be used as a generator, dynamo, or in any other suitable method to convert work exerted by a rider on the pedal assembly 140 to user power 330. In some embodiments, the rider control module 220 sets a "virtual resistance" 320 controlling the difficulty of turning the pedals of the pedal assembling 140 to provide variable resistance for the rider to pedal against. For example, the rider control module 220 can vary a current drawn from the pedal motor 310 by the battery 340 to alter the resistance of the pedal motor 310 to being turned by the pedal assembly 140, according to some implementations. In some embodiments, the virtual resistance 320 is static and, for example, determined by the specifications of the pedal motor 140 or a resistance set based on any other suitable factor. Similarly, in some embodiments, a human rider can manually select the virtual resistance 320 from a set of predetermined values (for example, choosing a "gear" out of a set of virtual resistances 320 configured to simulate a set of gears).

In other embodiments, the virtual resistance is set based on a "virtual gear ratio" based on the provided virtual resistance 320. As used herein, a "virtual gear ratio" is a ratio of torque applied by a rider on the pedal assembly 140 to the torque output by the hub motor 360. The virtual gear ratio can be set to simulate the feel of pedaling based on the current road conditions while in an appropriate gear. For example, the virtual gear ratio can account for the current incline and surface conditions of the road (for example, a traction or roughness of the road surface), the current pedal cadence of the rider, and/or a current speed of the autonomous electronic bicycle 100. In some embodiments the virtual gear ratio is further based on one or more rider parameters about or selected by the rider. For example, the virtual gear ratio can be determined based on characteristics of the rider, such as the rider's weight, height, experience riding a bicycle, or a measure of strength of the rider. Similarly, the virtual gear ratio can be determined at least partially by an aid term governing how much electronic assistance is provided by the hub motor 360 (that is, how much additional power the hub motor 360 provides above matching the user power 330). Therefore, in some implementations, operation of an autonomous electronic bicycle 100 by a rider associated with a high aid term results in a relatively lower virtual gear ratio and easier pedaling (e.g. less input work) for the rider on a given incline and surface condition but while retaining the same output power 350 as a rider with a lower aid term. An aid term can be explicitly selected by the rider, be selected based on a user score or characteristic, or be determined based on any other suitable factor.

Figure 4:
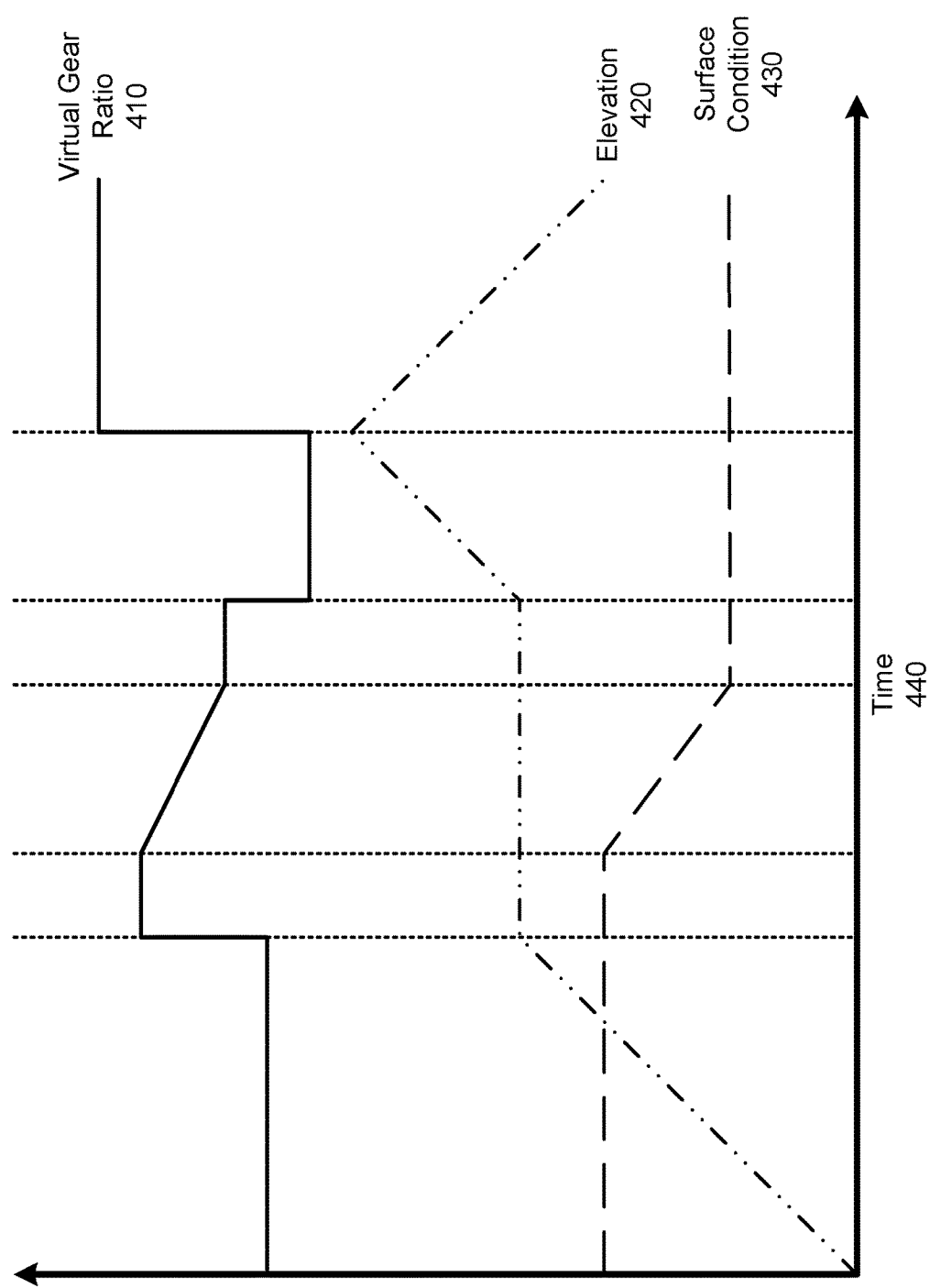
FIG. 4 is a graph illustrating an example virtual gear ratio during changing elevation and surface conditions, according to an embodiment.

FIG. 4 is a graph illustrating an example virtual gear ratio during changing elevation and surface conditions, according to an embodiment. The graph 100 of FIG. 4 comprises a virtual gear ratio 410, an elevation 420, and a surface condition 430 graphed against time 440. Here, the vertical axis of the graph 400 is not labeled and represents shows the relative change in the gear ratio 410 in relation to the elevation 420 and the surface condition 430. Here, the virtual gear ratio 410 is graphed such that higher virtual gear ratios make pedaling relatively harder, while lower gear ratios make pedaling relatively easier. That is, a higher gear ratio represents a higher ratio of pedal torque to motor torque (for example, 1:1.5), while a lower gear ratio represents a lower ratio of pedal torque to motor torque (for example, 1:2).

In the embodiment of FIG. 4, the elevation line 420 plots the contours of the surface the autonomous electronic bicycle 100 is ridden on over time. In some embodiments, the virtual gear ratio 410 depends on the current inclination of the road surface and therefore, the current slope of the elevation line 420. Similarly, in the embodiment of FIG. 4, the virtual gear ratio 410 is proportionally lower when the autonomous electronic bicycle 100 is currently being ridden up an incline (for example, up a hill) and proportionally higher when the autonomous electronic bicycle 100 is being ridden on a decline (for example, down a hill) than the baseline value when the autonomous electronic bicycle 100 is riding over level ground.

Similarly, the virtual gear ratio can change depending on the surface condition the autonomous electronic bicycle 100 riding over. In some embodiments, the surface condition 430 reflects the overall traction and rolling resistance of the road surface. For example, a wet surface would have lower surface condition 430 than a dry surface and a dusty, gravel, or off-road surface would have a lower surface condition 430 than an asphalt street. In the embodiment of FIG. 4, a lower surface condition 430 leads to a lower/easier virtual gear ratio 410

Although not shown in FIG. 4, other factors can also be used to determine the virtual gear ratio 410, for example, the current speed of the autonomous electronic bicycle 100 can influence the virtual gear ration 410, where, in some implementations, a higher current speed results in a higher virtual gear ratio. The virtual gear ratio 400 can be calculated using any suitable formula. For example, the virtual gear ration 400 can be determined as a weighed combination of the current inclination, surface condition, speed, aid factor, and any other suitable factors. Further, in some implementations, there can be a maximum power output limitation for the autonomous electronic bicycle 100. For example, in some areas there may be legal limits to the maximum power that can be output by the autonomous electronic bicycle 100. Therefore, the virtual gear ration 410 can reflect this and/or other limits or caps on the virtual gear ratio 410.

Figure 5:
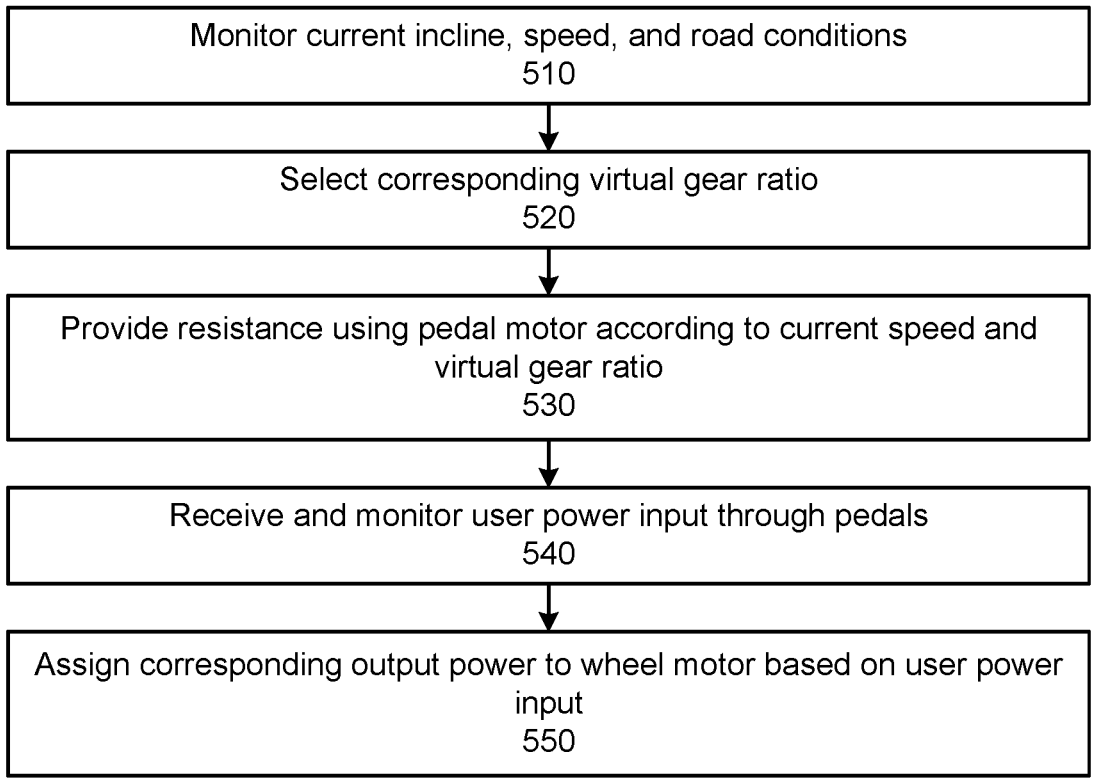
FIG. 5 is a flowchart illustrating a process for determining and implementing a virtual gear ratio in an electronic bicycle, according to an embodiment.

FIG. 5 is a flowchart illustrating a process for determining and implementing a virtual gear ratio in an electronic bicycle, according to an embodiment. The process 500 begins with the rider control module monitors 510 a current incline, speed, and road condition of an autonomous electronic bicycle, selecting 520 a corresponding virtual gear ratio (for example, based on a weighted combination of the incline, speed, and road conditions. Then, based on the virtual gear ratio, the pedal motor can provide 530 resistance to the pedals of the autonomous electronic bicycle. As the autonomous electronic bicycle receives 540 user input power through the pedal assembly a corresponding output power is assigned 550 to one or more wheel motors based on the user power input.

Autonomous Electronic Bicycle Navigation

As described above, the navigation system 225 can determine a target pose for the autonomous electronic bicycle 100 at a future point in time. In some embodiments, the target pose is based on known information about the immediate surrounding area around the autonomous electronic bicycle 100. For example, the navigation system 225 may have the eventual destination and a route to the destination from a starting point, but might only have a detailed local environment map within the immediate vicinity of the autonomous electronic bicycle 100. For example, the local environment map can include detailed object detection information within the range (in some cases approximately 30 feet) of a depth sensor system of the autonomous electronic bicycle 100 and less reliable objected detection information within the visual range of one or more RGB (visual light) cameras of the autonomous electronic bicycle. Therefore, the navigation system 225 can determine a target pose defining a desired position of the autonomous electronic bicycle 100 five or ten seconds in the future (or, in some embodiments, a variable time in the future dependent on the situation). Therefore, the navigation system 225 can gather positional data for the autonomous electronic bicycle 100 at a variety of levels of detail and through any suitable methods and, based on the gathered positional and/or environmental data, the current route, and the chosen destination, determine a target pose for the autonomous electronic bicycle 100 to attempt to achieve.

Figure 6:
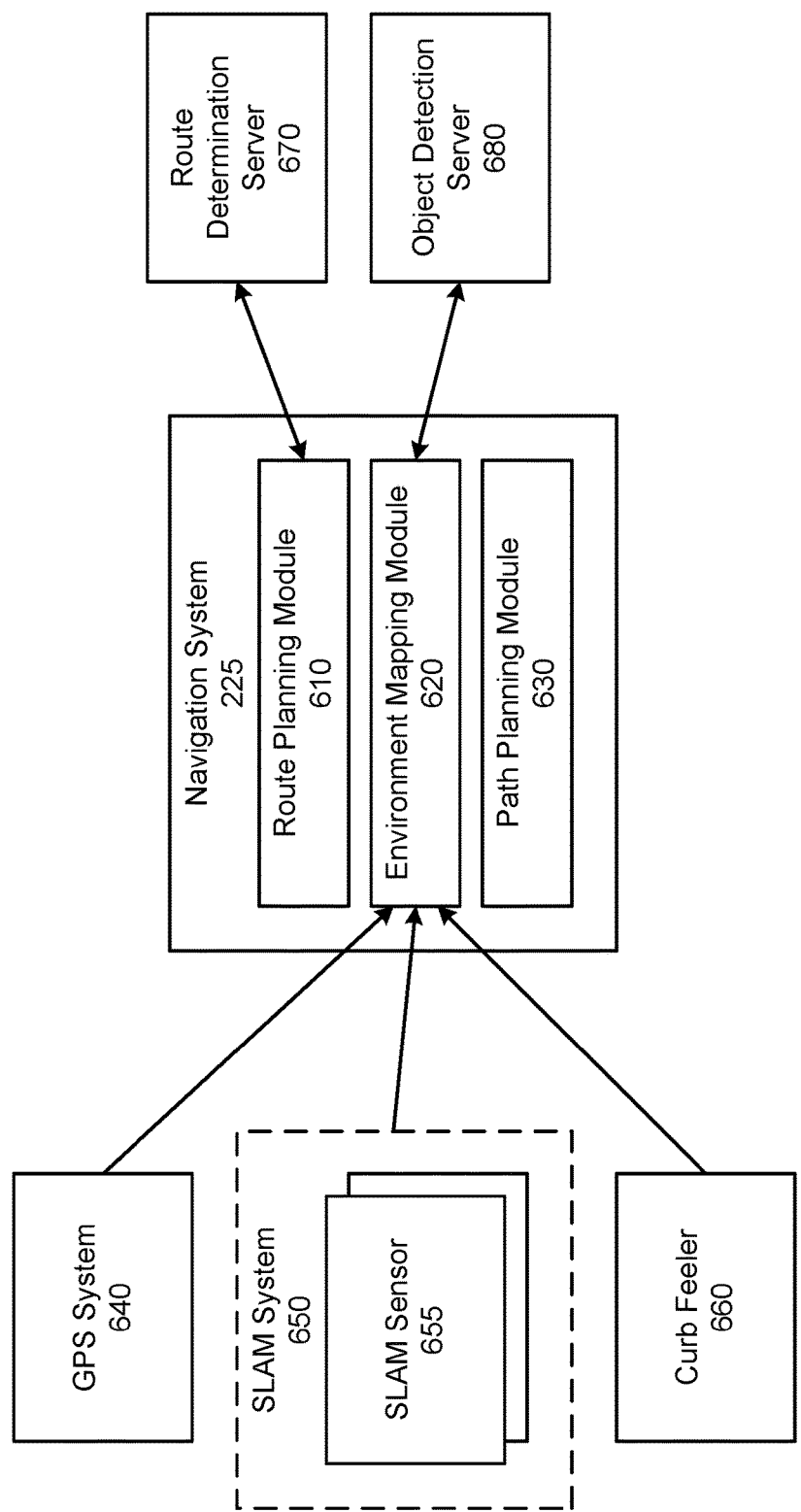
FIG. 6 is a block diagram of a navigation system for an autonomous electronic bicycle, according to an embodiment.

FIG. 6 is a block diagram of a navigation system for an autonomous electronic bicycle, according to an embodiment. The block diagram 600 of FIG. 6 comprises a navigation system 225, a GPS system 640, a SLAM system comprising a set of SLAM sensors 655, a curb feeler 660, a route determination server 670, and an object detection server 680. In the embodiment of FIG. 6, the navigation system 225 comprises a route planning module 610, an environment mapping module 620, and a path planning module 630.

The route planning module 610 can determine a route for the autonomous electronic bicycle 100 to a given destination from a known starting location. For example, the current location of the autonomous electronic bicycle 100 or a location of the autonomous electronic bicycle 100 when the destination was selected. In some embodiments, the route planning module 610 can receive a route determined by the route determination server 670, which, as described above, may be a third-party service or integrated into the Autonomous Bicycle Support Server 280. The route can be determined using any suitable methods or parameters, for example, by prioritizing streets with bike lanes and right turns to avoid interactions between an autonomous electronic bicycle 100 and vehicle traffic (for example, caused by crossing lanes of traffic to make a left turn). In other embodiments, the route planning module 610 may determine a suitable route or destination internally.

The environment mapping module 620 can gather and analyze positional and environmental data about the surroundings of the autonomous electronic bicycle 100 to determine a precise position and local map of the environment around the autonomous electronic bicycle 100 from which to base the autonomous electronic bicycle's future movements, according to some embodiments. In some implementations, the environment mapping module 620 can perform a three-stage localization process using input from the GPS system 640, SLAM system 650, and curb feeler 660 to determine a current position and local map for the autonomous electronic bicycle 100. The localization process will be discussed in further detail below.

In some implementations, some or all of the computational tasks of the environment mapping module 620 can be performed remotely by an object detection server 680 (e.g., a remote or cloud-based server), depending on the current conditions and the speed of the autonomous electronic bicycle 100. In some implementations, performing these tasks remotely can lead to power savings on the autonomous electronic bicycle 100 without a loss of controllability and, depending on the capacity of the autonomous electronic bicycle 100 for calculations, faster results for the environment mapping module 620. In some implementations, a lag time or estimated lag time to transfer data to the object detection server 680 and the current speed of the autonomous electronic bicycle 100 determines if the environment mapping module 620 performs computations locally or if some or all computations are outsourced to the object detection server 680.

The GPS system 640 can be any suitable GPS system capable of determining a coordinate position of the autonomous electronic bicycle 100. Many GPS systems 640 can represent the position of the autonomous electronic bicycle 100 within a certain degree of accuracy, which may be further refined by further analysis in some embodiments.

The SLAM system 650 comprises a set of SLAM sensors 655 which can be used to determine a local environment map for the autonomous electronic bicycle 100. A local environment map can comprise information about the location, size, shape, and/or type of one or more obstacles in the local environment of the autonomous electronic bicycle 100. Similarly, the local environment map can contain terrain contour information about the local environment of the autonomous electronic bicycle 100 or a localized position of the autonomous electronic bicycle on an existing map of an operating area. The set of SLAM sensors 655 can include any suitable type of sensor, for example one or more cameras (for example, RGB cameras and/or infrared cameras), depth sensor systems (for example, RADAR, SONAR, LIDAR, or IR depth sensor systems), gyroscopes, accelerometers, or any other suitable type of sensor. In some implementations, the SLAM system 650 includes a VSLAM system using RGB cameras to determine a position of the autonomous electronic bicycle 100 on a pre-generated map and to perform rough object recognition. Similarly, the SLAM system 650 can include one or more depth sensor systems configured to refine the object detection of the VSLAM system. In some implementations, the SLAM system 650 detects and tracks one or more "dynamic actors" in the local environment of the autonomous electronic bicycle 100. Here, a "dynamic actor" refers to a moving object in the local environment, such as another vehicle or a pedestrian. The SLAM system 650 can recognize a dynamic actor and track its motion over time and, according to some embodiments, the environment mapping module 620 predicts an expected position of the dynamic actor to aid in planning the eventual path of the autonomous electronic bicycle 100 through the local environment.

The curb feeler 660 can be a sensor or sensor system adapted to determine the distance between the autonomous electronic bicycle 100 and an adjacent curb or other similarly positioned obstacle marking an edge of a road or path. For example, the curb feeler 660 can detect the distance or proximity between the autonomous electronic bicycle 100 and an adjacent curb, wall, or parked car. In some embodiments, the curb feeler 660 is a virtual curb feeler which does not need to physically contact the curb to determine curb distance, for example, by using a camera or laser rangefinder system to determine a distance from the curb. In other embodiments, the curb feeler 660 is a physical curb feeler which makes physical contact with a curb or other obstacle to measure curb distance.

Based on the current position and local environment map of the autonomous electronic bicycle 100, for example the environment mapping module 620, the path planning module 630 can determine a target pose for the autonomous electronic bicycle 100. For example, the path planning module 630 can determine a target pose avoiding obstacles in the local environment map. The selection of a target path and/or target pose by the path planning module 630 will be discussed further below.

Figure 7:
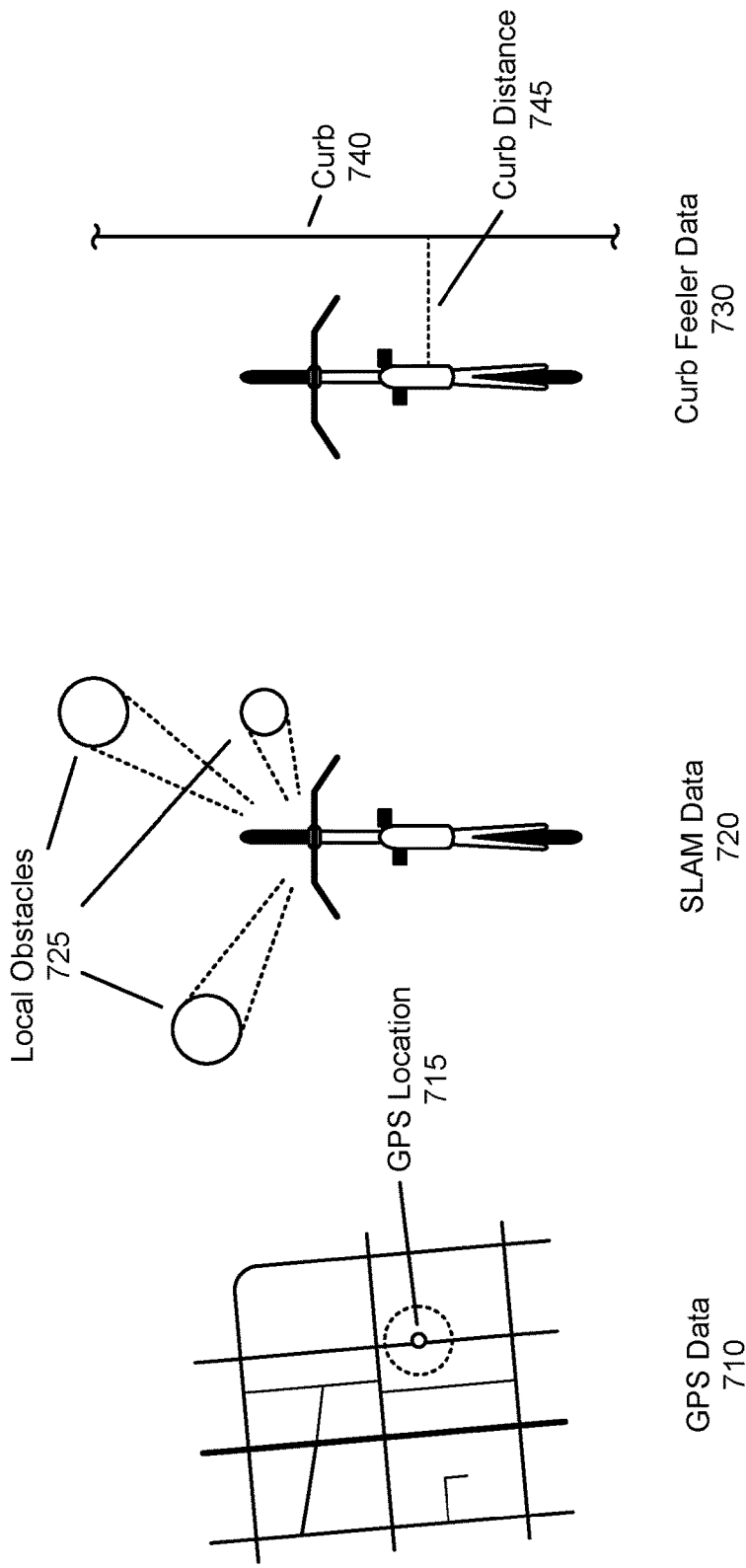
FIG. 7 illustrates a three-stage localization process for detecting the environment and location of an autonomous electronic bicycle, according to an embodiment.

FIG. 7 illustrates a three-stage localization process for detecting the environment and location of an autonomous electronic bicycle, according to an embodiment. The three-stage localization process 700 comprises analysis of GPS data 710 including a GPS location 715, SLAM data 720 comprising information about one or more local obstacles 725, and curb feeler data 730 comprising a curb distance 745 from a curb 740.

In some embodiments, the environment mapping module 620 gathers data simultaneously from the GPS system 640, SLAM system 650, and curb feeler 660. The environment mapping module 620 can analyze the gathered data in three stages to build a local map of the environment around the autonomous electronic bicycle 100 and the position of the autonomous electronic bicycle 100 within the environment relative to the destination and the determined route. In some embodiments, the three-stage localization process begins with an analysis of the GPS data 710, including a GPS location 715, to determine a general position of the autonomous electronic bicycle 100 relative to the destination, the local environment, and the determined route.

The environment mapping module can analyze the GPS data 710 using any suitable method based on the received GPS location 715. In some implementations, the GPS data 710 includes information about a current domain of the autonomous electronic bicycle 100. As used herein, a domain of the autonomous electronic bicycle 100 can comprise information about the general context or type of the environment around the autonomous electronic bicycle 100. For example, a domain of the autonomous electronic bicycle 100 can include what type of road or path the autonomous electronic bicycle 100 is on (for example, if the autonomous electronic bicycle 100 is travelling on a road with no bike lane, on a road with a bike lane, or on a bike path), if the autonomous electronic bicycle 100 is at an intersection or not, speed limits, estimated traffic levels, or any other suitable information about the general environment around the autonomous electronic bicycle 100.

Next, the SLAM data 720 gathered from the SLAM system 650 can be analyzed to determine a local environment map, for example comprising terrain conditions, a refined position of the autonomous electronic bicycle 100 on a pre-mapped area, and the locations and sizes of one or more local obstacles 725 in the local environment around the autonomous electronic bicycle 100. As described above, the SLAM data 720 can comprise data from any suitable sensor, such as RGB cameras (for example, of a VSLAM system), infrared cameras, RADAR, SONAR, LIDAR, gyroscopes, and/or accelerometers. In some embodiments, the SLAM data 720 is augmented with input from external cloud-based data providers. For example, the SLAM data 720 can comprise details of the state of traffic lights or other traffic controls at an intersection received from an external source. The environment mapping module 620 can analyze the SLAM data 720 using any suitable method and may use sensor fusion and/or any other suitable techniques to determine a local environment map based on the SLAM data 720.

In some embodiments, the GPS data 710 and SLAM data 720 is augmented by curb feeler data 730 from a specialized curb feeler 660 to determine a curb distance 745 measuring the distance between the autonomous electronic bicycle 100 and a curb 740 of the road or path the autonomous electronic bicycle 100 is traveling down. In some embodiments, the curb distance 745 can describe the distance between the autonomous electronic bicycle 100 and a parked car, wall, or other edge of a road, as measured by the curb feeler 660. Curb data may not always be available, for example, a bike path with no curb, or if the road has a shoulder such that the curb is out of range of the curb feeler 660. In some embodiments, some embodiments may use other methods to determine a position of the curb or road edge relative to the bicycle 100, for example visual object recognition methods.

Using the gathered data, the navigation system 225 can determine a local map comprising the locations and relative positions of the autonomous electronic bicycle 100 and one or more obstacles and, in some embodiments, information about the local topography of the terrain (such as the inclination of the current road surface).

Figure 8:
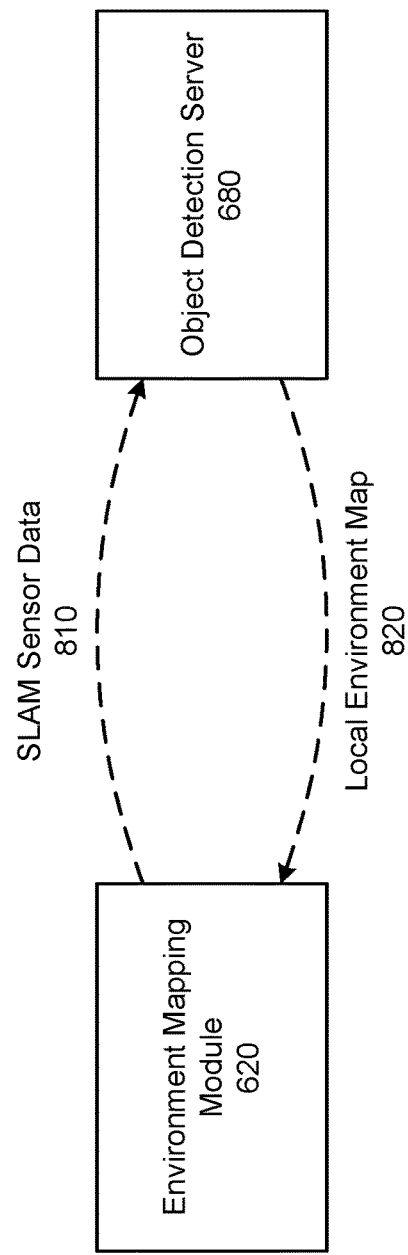
FIG. 8 is a block diagram illustrating a method for performing object recognition tasks on a remote server, according to an embodiment.

FIG. 8 is a block diagram illustrating a method for performing object recognition tasks on a remote server, according to an embodiment. The environment 800 of FIG. 8 comprises an environment mapping module 620 which sends SLAM sensor data 810 to an object detection server 680 which can analyze the received data and return a local environment map 820 (or some other appropriate intermediate stage of the analysis, such as a set of detected objects based on the SLAM sensor data 810) to the environment mapping module 620. As described above, in some embodiments, some or all of the analysis and generation of the local environment map can be performed on an external object detection server 680.

In the embodiment of FIG. 8, the SLAM sensor data 810 can comprise images from one or more cameras, scans or other data from RADAR, SONAR, or LIDAR systems, and/or any other suitable systems. For example, object detection calculations and/or other computationally intensive aspects of the analysis of SLAM sensor data 810 from the SLAM system 650 can be performed remotely on the object detection server 680. The object detection server 680 can then return an environment map 820 (for example, comprising a set of detected objects along with other topographic data about the surrounding environment) which can be used for further analysis on the autonomous electronic bicycle 100 or in any other suitable manner.

When compared to the local processing power of the autonomous electronic bicycle 100, the object detection server 680 can have access to significantly more processing power, for example, through access to server hardware, no (or relatively no) limitations of battery capacity, power consumption, weight, or space. Further, computations performed on the object detection server 680 do not consume the limited battery resources of the autonomous electronic bicycle 100. Therefore, the use of the object detection server 680 for some calculation can result in power consumption savings on the autonomous electronic bicycle 100. In many embodiments, an autonomous electronic bicycle 100 is much lighter than most other types of autonomous vehicles, such as autonomous cars or trucks, therefore requiring much less energy to move (especially when in autonomous mode without the additional weight of a rider). However, an autonomous electronic bicycle 100 still has to perform many of the same computations to determine a local environment map and detect and avoid obstacles along its route. Therefore, object detection and other computational tasks associated with determining the local environment map can comprise a relatively large portion of the total power consumption of the autonomous electronic bicycle 100 (in some embodiments up to 30% of total power consumption). Thus, outsourcing some or all of the computational work of determining a local environment map 820 to the remote object detection server 680 can extend the maximum operating time of the autonomous electronic bicycle 100. Further, an autonomous electronic bicycle 100 in many cases operates at lower speeds than other autonomous vehicles, such that the time for the autonomous electronic bicycle 100 to make a necessary course correction between obstacle detection and collision with the obstacle is longer. This reduces a potential downside of communication lag between the object detection server 680 and the autonomous electronic bicycle 100.

In some implementations, analysis of the SLAM sensor data 810 can be performed locally on the autonomous electronic bicycle 100 (for example, using the environment mapping module 620) or remotely on a connected server, (for example, using the object detection server 680). The environment mapping module 620 can switch between local analysis and remote analysis using an object detection server 680 based on a transmission lag and/or connection strength between the autonomous electronic bicycle 100 and the object detection server 680, an estimated compute time and/or power consumption to perform the computations locally, a current speed of the autonomous electronic bicycle 100, or any other suitable factor. In some implementations, the number of detected dynamic actors (such as moving obstacles or other vehicles in the local environment) within a proximity of the autonomous electronic bicycle 100 can determine if computations are performed locally or remotely.

In some embodiments, while object detection or other SLAM data analysis is being performed remotely on the object detection server 680, the autonomous electronic bicycle 100 reduces speed to a threshold speed to minimize the effects of transmission lag on the responsiveness of the autonomous electronic bicycle 100. Similarly, the current domain of the autonomous electronic bicycle 100 can enable or disable the ability to use the object detection server 680 for remote data analysis. For example, when the autonomous electronic bicycle 100 is in an intersection domain, generation of the local environment map can be performed locally and use of the object detection server 680 can be disabled for as long as the autonomous electronic bicycle 100 remains in the intersection domain.

In some implementations, the use of the object detection server 680 is determined by the autonomous electronic bicycle 100 based on a comparison of the estimated transmission lag between the autonomous electronic bicycle 100 and the object detection server 680 against an estimated compute time to perform the calculations locally on the autonomous electronic bicycle 100 (assuming a negligible or given compute time on the object detection server 680). Then, if performing the computations remotely results in a faster overall result, the computations can be performed remotely.

Figure 9:
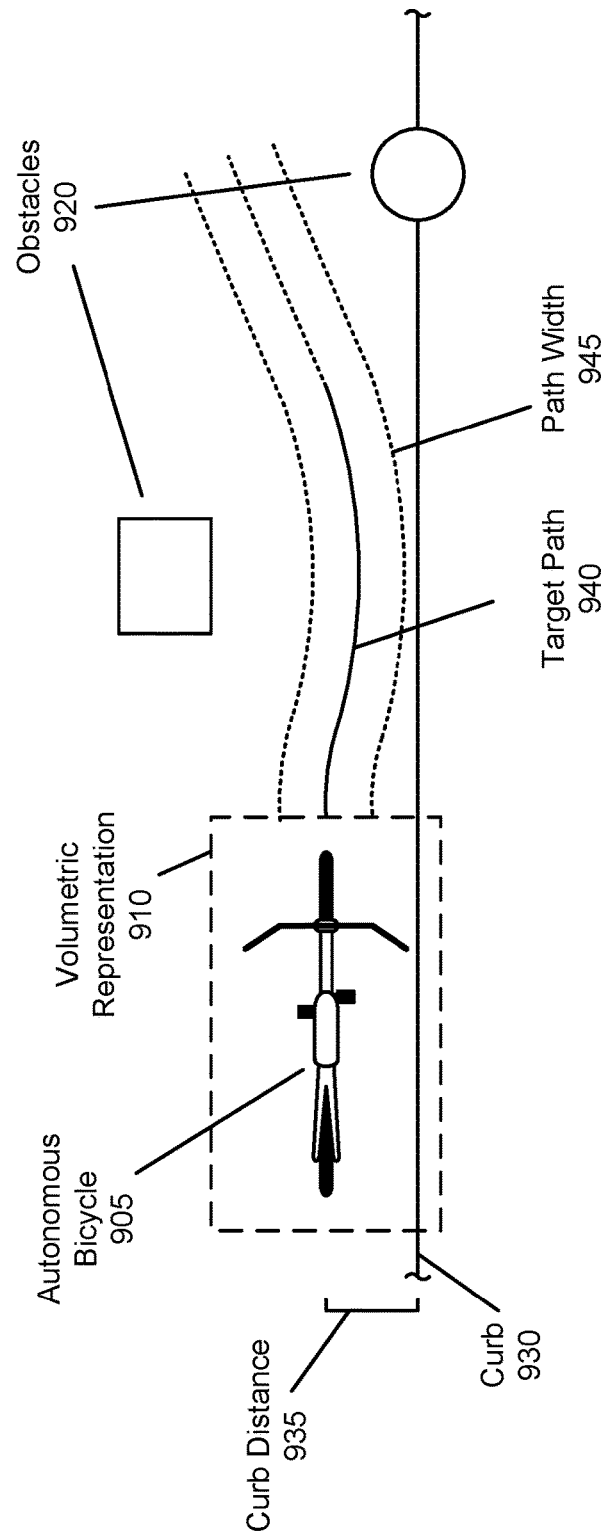
FIG. 9 illustrates a target path of an autonomous electronic bicycle, according to an embodiment.

FIG. 9 illustrates a target path of an autonomous electronic bicycle, according to an embodiment. The embodiment of FIG. 9 includes an example local map 900 comprising an autonomous bicycle 905, a volumetric representation 910 of the autonomous bicycle 905, one or more obstacles 920, a curb 930 with a curb distance 935 to the autonomous bicycle 905, and a target path 940 for the autonomous bicycle 905 through the environment with a defined path width 945.

In some embodiments, the navigation system 225 generates the target path 940 based on a volumetric representation 910 of the autonomous electronic bicycle 905. The volumetric representation 910 can be a simplified volumetric shape such as a bounding box constructed to accommodate for different possibilities of the current pose or state of the autonomous electronic bicycle 905, for example, different lean or handlebar angles of the autonomous electronic bicycle 905.

The target path can be determined using any suitable method to avoid or minimize collisions between the autonomous bicycle 905 and the obstacles 920. For example, the target path can have a defined path width to account for both the volumetric representation 910 and differing wheel paths between the front and rear wheels of the autonomous electronic bicycle 100.

In some implementations, the target path 940 is represented as a target pose of the autonomous electronic bicycle 905, where, as described above, the target pose represents a target position and orientation of the autonomous electronic bicycle 905 at a given point in time. In other embodiments, the target path 940 is stored at the navigation system 225 (while being continuously updated based on incoming environmental data) and a target pose is periodically generated to send to the balance system 230 based on the current target path. For example, the target pose can be selected as the point on the target path the autonomous electronic bicycle is predicted to reach 3 or 5 seconds in the future. In some implementations, a target pose additionally comprises a target lean angle (in many cases, a relatively upright lean angle), a target speed dependent on the current domain of the autonomous electronic bicycle 100 and the number and proximity of the obstacles 920, and any other suitable information about the desired state of the autonomous electronic bicycle 100.

Figure 10:
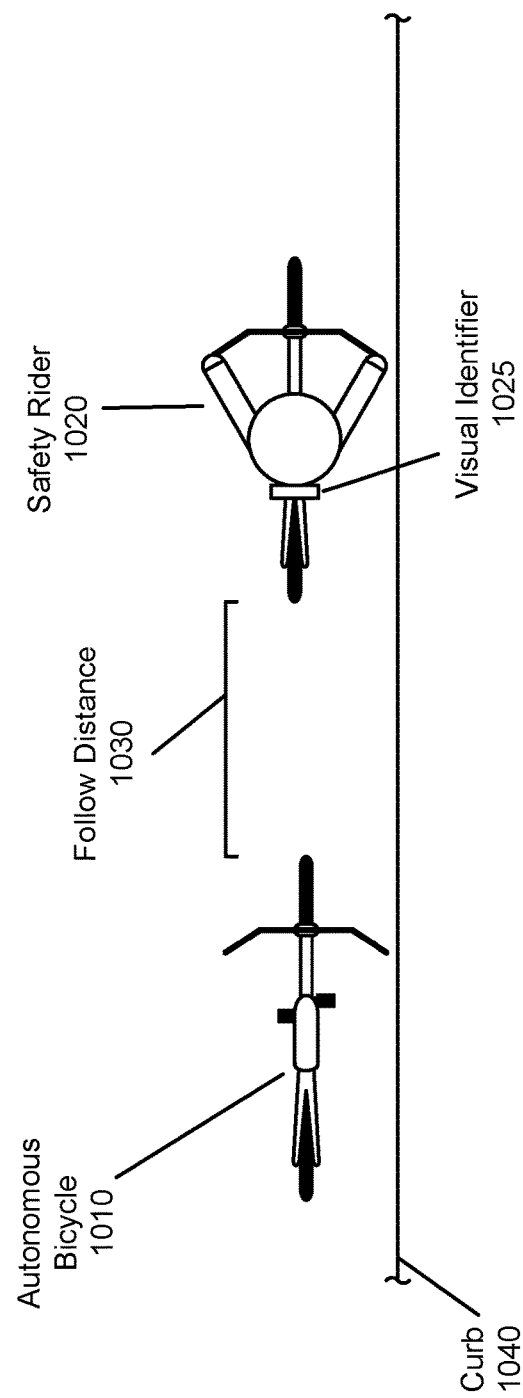
FIG. 10 illustrates a training method for an autonomous electronic bicycle, according to an embodiment.

FIG. 10 illustrates a training method for an autonomous electronic bicycle, according to an embodiment. The environment 1000 of FIG. 10 comprises an autonomous bicycle 1010 following a safety rider 1020 at a set follow distance 1030 based on a visual identifier 1025 of the safety rider 1025 through an environment comprising one or more obstacles such as a curb 1040. In some embodiments, a human operated bicycle (here, the safety rider 1020) is used for data gathering purposes or for limited operation of the autonomous electronic bicycle 1010. The autonomous bicycle 1010 can be configured to follow the visual identifier 1025 (such as a mounted pattern or QR code) of the safety rider at a set follow distance 1030. The autonomous bicycle 1010 can identify the visual identifier 1025 through any suitable method, for example, using image recognition. The use of a safety rider system can allow data gathering to further refine the operation of the navigation system 225. In some embodiments, the safety rider 1020 can lead the autonomous electronic bicycle 100 all or part of the way to a selected destination. The use of a safety rider 1020 can allow one or more following autonomous electronic bicycles 100 to gather data about real-world road conditions (for example, for training the navigation system 225) in a more controlled environment than if the autonomous electronic bicycle 100 was operating fully autonomously.

Figure 11:
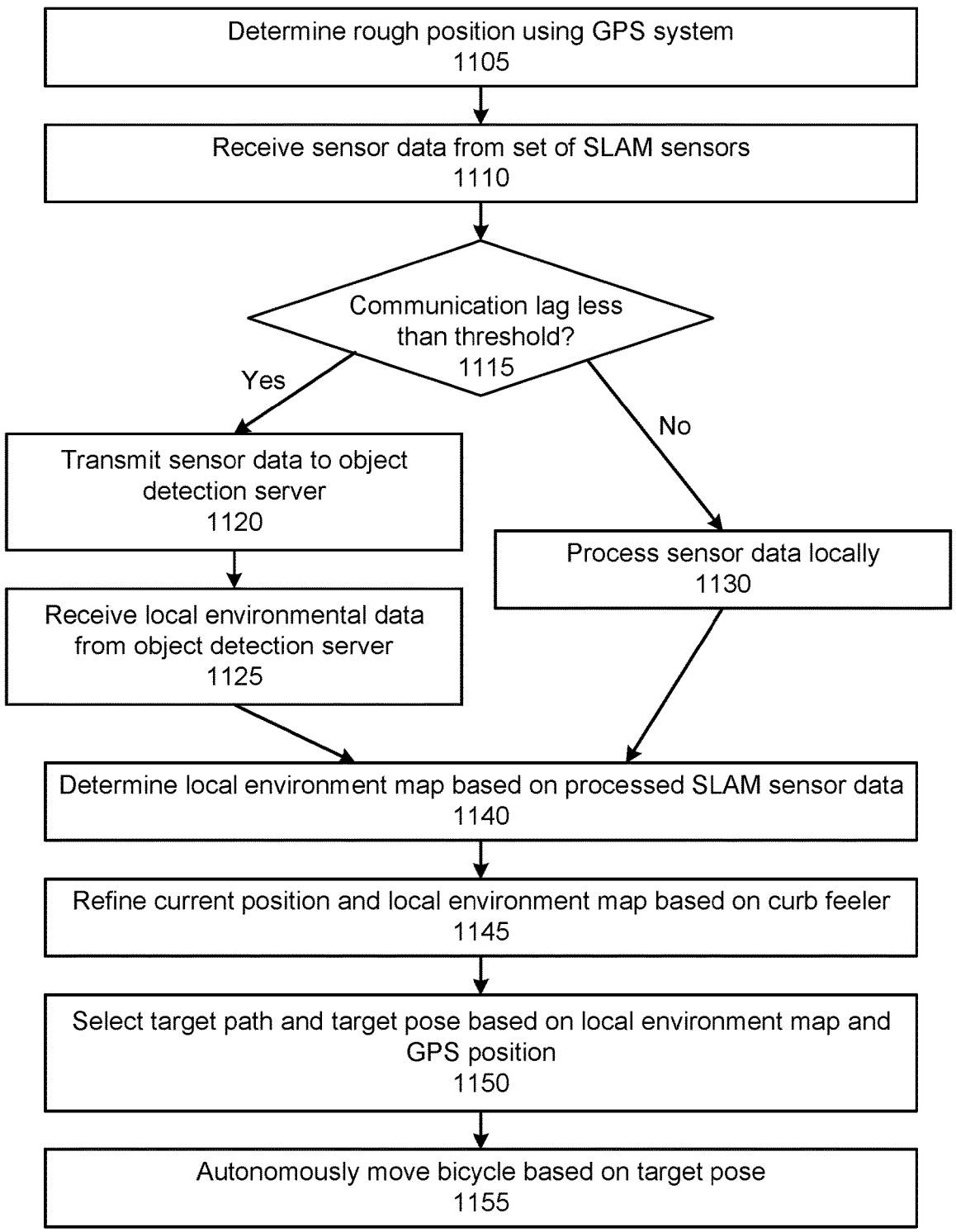
FIG. 11 is a flowchart illustrating a process for navigating an autonomous electronic bicycle, according to an embodiment.

FIG. 11 is a flowchart illustrating a process for navigating an autonomous electronic bicycle, according to an embodiment. The process 1100 begins when the environment mapping module determines 1105 a rough position of the autonomous electronic bicycle using the GPS system. Then, after receiving 1110 sensor data from a set of SLAM sensors, the environment mapping module can check 1115 if the communication lag to an object detection server is less than a specific threshold, for example an estimated amount of times the corresponding calculations would take to perform locally. If communication lag is lower than the threshold, the environment mapping module then transmits 1120 sensor data to the object detection server and receives 1125 local environmental data from an object detection server (such as a set of detected objects and locations). Otherwise, if the communication lag is greater than the threshold (or for any other reason), the environment mapping module can process 1130 the sensor data locally. After the SLAM sensor data is processed, the environment mapping module (or, in some cases, the object detection server) can determine 1140 a local environment map based on the processed SLAM sensor data. Then the current position and local environment map is refined 1145 based on curb distance information from one or more curb feelers. Based on the local environment map and the received GPS position, the path planning module can select 1150 a target path and/or a target pose for the autonomous electronic bicycle. Finally, based on the target pose, the bicycle control system can autonomously move 1155 the autonomous electronic bicycle.

Balance Control of Electronic Bicycle

After a target pose is selected for the autonomous electronic bicycle 100, the balance system 230 can manipulate the controllable components of the of the autonomous electronic bicycle 100 to cause the autonomous electronic bicycle 100 to move towards the desired pose (while remaining upright). For example, the balance system 230 can control the output torque of one or more of the hub motors 115 and 135 and the steering motor 125 to balance the autonomous electronic bicycle 100 while additionally powering the rear hub motor 115 to drive the autonomous electronic bicycle 100 forward.

Figure 12A:
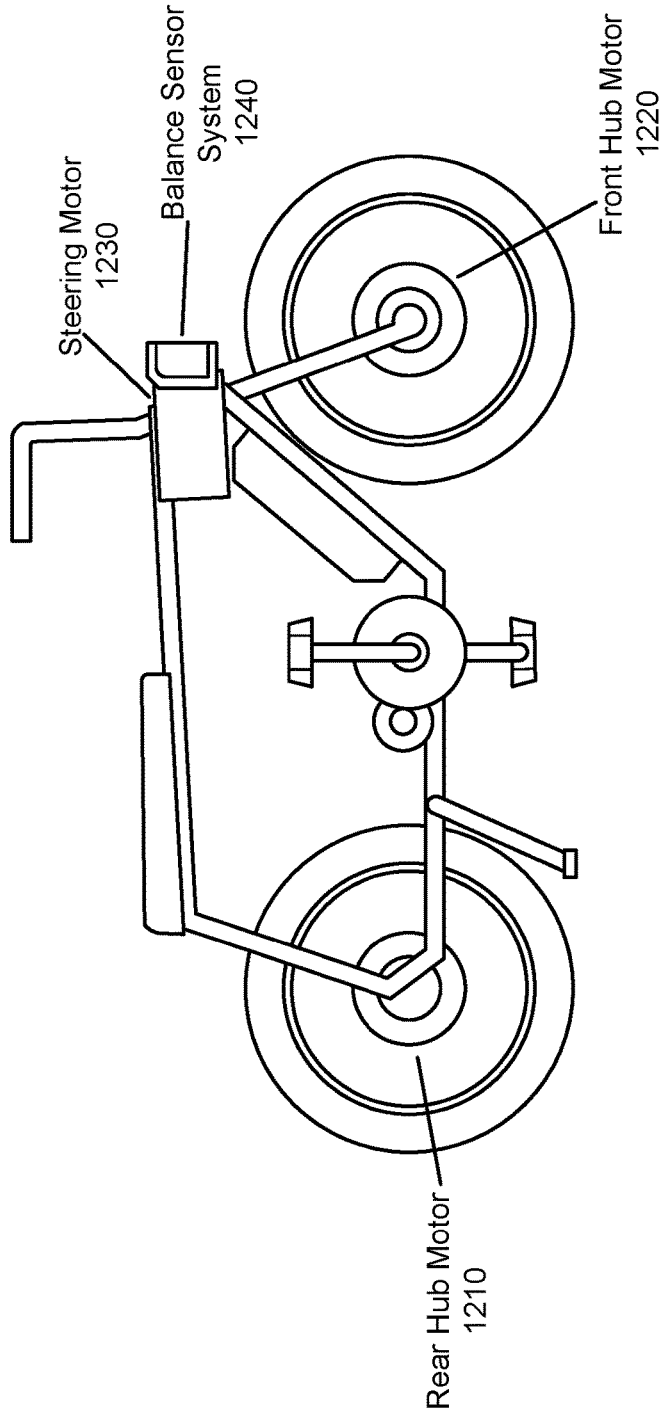
FIG. 12A illustrates balancing components of an example autonomous electronic bicycle, according to an embodiment.

FIG. 12A illustrates balancing components of an example autonomous electronic bicycle, according to an embodiment. The autonomous electronic bicycle 1200 of FIG. 12A comprises a rear hub motor 1210, front hub motor 1220, steering motor 1230, and balance sensor system 1240. The balance sensor system 1240 can comprise a set of balance sensors used to measure the current state of the autonomous electronic bicycle 100, current road inclinations, and/or road conditions. In some embodiments, the steering motor 1230, rear hub motor 1210, and front hub motor 1220 are used by the autonomous electronic bicycle 100 to affect the pose and/or the speed of the autonomous electronic bicycle 100. For example, these components can be used to achieve (or attempt to achieve) a target pose of the autonomous electronic bicycle 100.

Figure 12B:
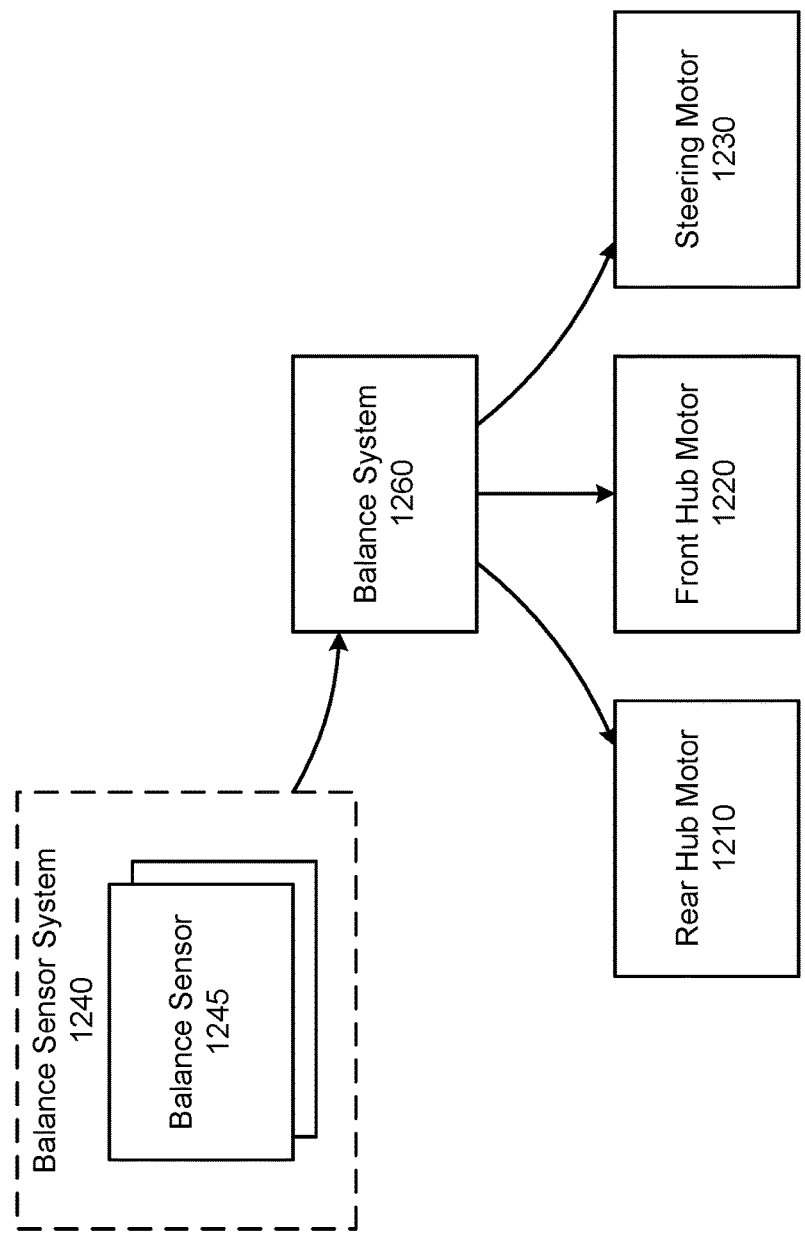
FIG. 12B is a block diagram of the balancing system of an example autonomous electronic bicycle, according to an embodiment.

FIG. 12B is a block diagram of the balancing system of an example autonomous electronic bicycle, according to an embodiment. The environment 1250 of FIG. 12B comprises a balance system 1260 communicatively connected to the rear hub motor 1210, front hub motor 1220, steering motor 1230, and balance sensor system 1240 comprising a set of balance sensors 1245.

The balance system 1260 can take input of a target pose along with other state information about the autonomous electronic bicycle 100 and determine a set of motor outputs setting the output torque or other suitable parameter of the rear hub motor 1210, front hub motor 1220, steering motor 1230, or other controllable aspect of the autonomous electronic bicycle 100 to attempt to achieve the target pose. In some embodiments, a neural network or other machine learning system is used to determine the updated motor outputs for balancing the autonomous electronic bicycle 100. The neural network, machine learning system, or other algorithm can be determined or trained using any suitable method and using data derived from, simulations, real-world testing, and any other suitable source.

The balance sensor system 1240 can comprise one or more balance sensors 1245 that can determine a current position, orientation, pose, or other determination of the state of the autonomous electronic bicycle 100. For example, one or more balance sensors can determine a current speed, current motor output to one or more motors of the autonomous electronic bicycle 100 (such as the steering motor 1230, rear hub motor 1210, and/or front hub motor 1220), the current incline and terrain conditions of the autonomous electronic bicycle 100, or any other suitable information.

Figure 13:
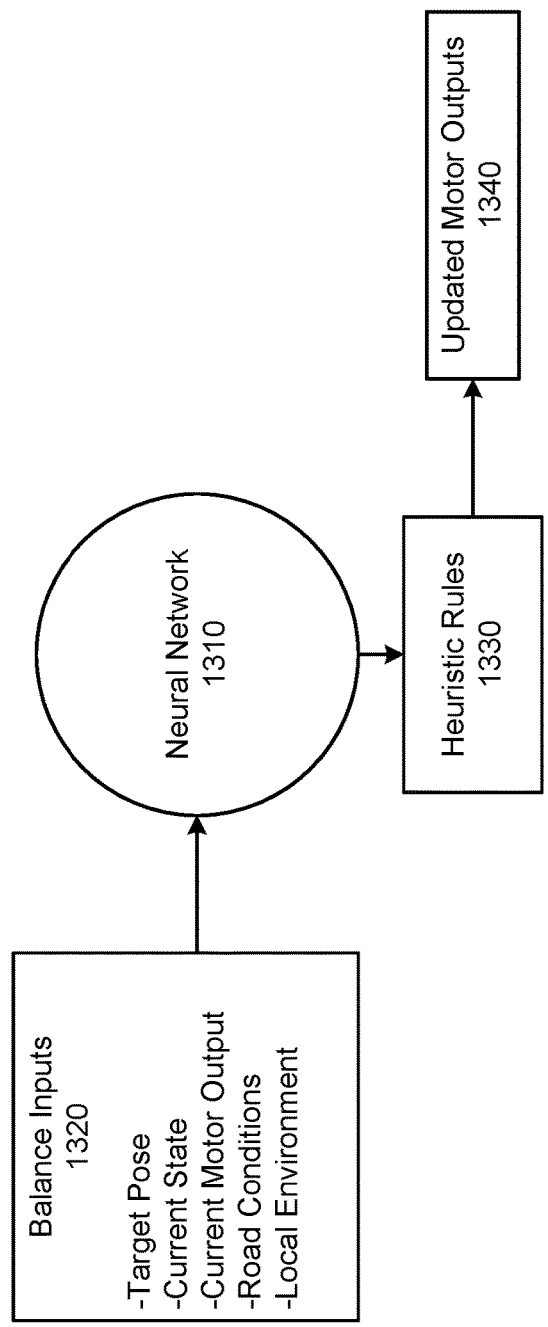
FIG. 13 is a block diagram illustrating a neural network for balancing an autonomous electronic bicycle, according to an embodiment.

FIG. 13 is a block diagram illustrating a neural network for balancing an autonomous electronic bicycle, according to an embodiment. The environment 1300 of FIG. 13 comprises a neural network 1310 which can input a set of balance inputs 1320 and output a preliminary set of updated motor outputs. The preliminary set of motor outputs can, in some embodiments, be fed through a set of heuristic rules 1330 to generate the final updated motor outputs 1340 used to drive the autonomous electronic bicycle 100.

In some embodiments, the balance inputs 1320 comprise information about the current state and target pose of the autonomous electronic bicycle 100, as well as other environmental factors that could affect the balance of the autonomous electronic bicycle 100. For example, the balance inputs can comprise information about the current state of the autonomous electronic bicycle 100 such as a current speed of the frame 105, rear wheel 115, and/or front wheel 135, a current heading, lean angle, pitch, or velocity of the autonomous electronic bicycle 100, a current acceleration or rate of change of the heading, lean angle, pitch, or velocity of the autonomous electronic bicycle 100 (for example, a current rate of change of the heading of the frame 105 measuring how quickly the autonomous electronic bicycle 100 is turning), information about one or more components of the autonomous electronic bicycle 100 such as a current steering angle, steering rate, or wheel velocity, and a current motor output of one or more motors of the autonomous electronic bicycle 100. Similarly, the balance inputs 1320 can comprise environmental factors, such as current domain, road conditions, or weather.

As described above, the neural network 1310 can be trained in any suitable manner and then return a preliminary set of motor outputs which can be refined by the heuristic rules 1330. In some implementations, the neural network 1310 can be trained to primarily use the front hub motor 135 and the steering motor 125 to control the balance of the autonomous electronic bicycle 100. In other embodiments, the balance system 1260 alternatively or additionally control the rear hub motor 115, or any other suitably component of the autonomous electronic bicycle 100, such as center of gravity shift mechanisms, as described above. The neural network 1310 can be trained using data gathered from the operation of other autonomous electronic bicycles 100, for example data gathered from the use of a safety rider 1020. The gathered data can be compiled and analyzed, and the neural network 1310 can be trained based on the analyzed data.

The balance system 1260 can, in some embodiments, react to undesired changes in the current state of the autonomous electronic bicycle 100 by using one or more motors of the autonomous electronic bicycle 100 to correct the current state with or without altering the current target pose. In some implementations, the balance system attempts to achieve the received target pose, which, as described above, can comprise the position and orientation of the frame 105 and therefore control steering motor 125 torque output rather than a specific steering angle of the steering assembly 120. That is, the balance system 1260 can determine if the autonomous electronic bicycle 100 should be turning more or less sharply, not a specific target steering angle, which can be affected by a current lean angle of the autonomous electronic bicycle 100, road conditions, or any other suitable factor, according to some embodiments.

After the neural network determines a set of preliminary motor outputs the preliminary motor outputs can be refined by the heuristic 1330 rules that can provide smoothing or limit the results of the neural network 1310 based on the current conditions, domain, or any other suitable factor. For example, the heuristic rules 1330 can account for maximum torque capabilities or other operational limits of one or more of the motors, smoothness limits, such as and a constraint on the rate of change of the steering motor output (to reduce "jerks" or unpredictable motion of the autonomous electronic bicycle 100), or any other suitable limitation on the motion of the autonomous electronic bicycle 100. In some implementations, one or more heuristic rules 1330 can depend on a current domain of the autonomous electronic bicycle 100 or other suitable factors. For example, heuristic rules 1330 can be added or disabled based on if the autonomous electronic bicycle 100 is performing emergency evasive maneuvers, based on the current slope or surface condition, or based on other domain information about the current domain of the autonomous electronic bicycle 100.

The updated motor outputs 1340 can comprise any suitable controllable aspect of the autonomous electronic bicycle 100, for example, the output of the rear hub motor 1210, front hub motor 1220, steering motor 1230, or any other suitable controllable aspect of the autonomous electronic bicycle 100.

Figure 14:
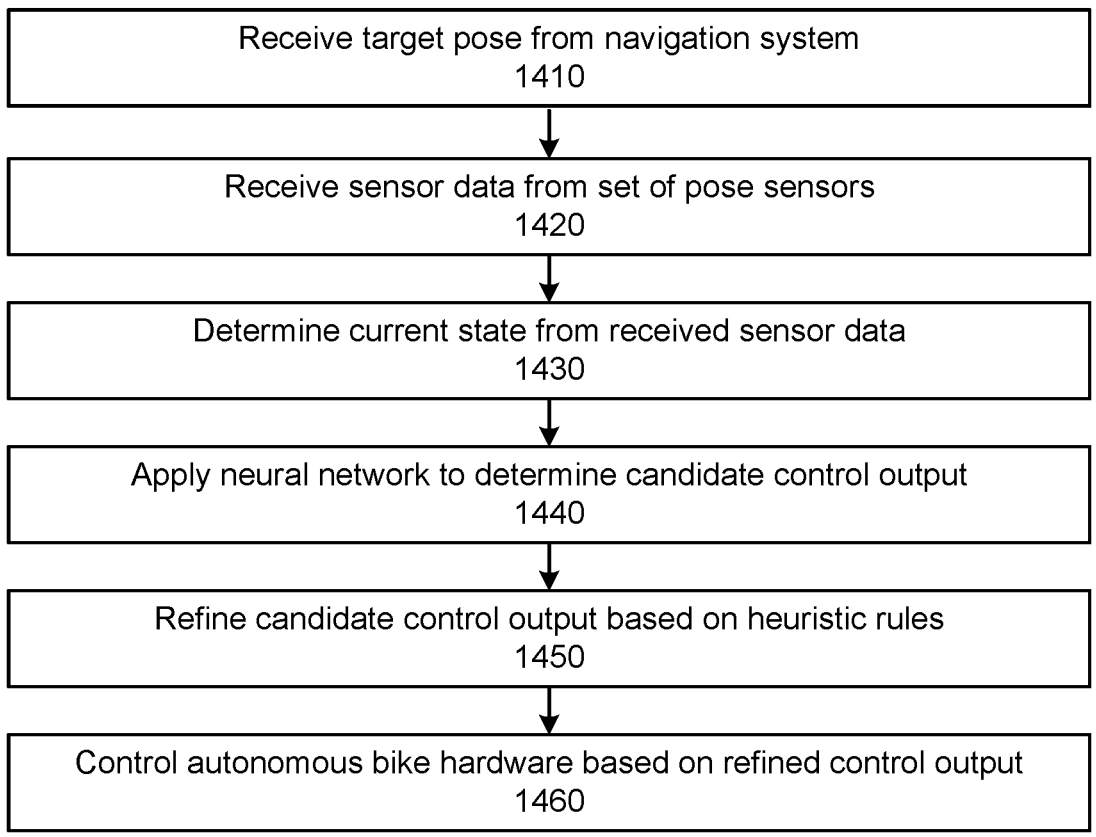
FIG. 14 is a flowchart illustrating a process for balancing an autonomous electronic bicycle, according to an embodiment.

FIG. 14 is a flowchart illustrating a process for balancing an autonomous electronic bicycle, according to an embodiment. The process 1400 of FIG. 14 begins when the balance system receives 1410 a target pose of the autonomous electronic bicycle from the navigation system. The balance system then receives 1420 sensor data about a current state (for example, including a current pose) of the autonomous electronic bicycle from a set of pose sensor, and determines 1430 the current state of the autonomous electronic bicycle based on the received sensor data. Using the received target pose and determined current state, a neural network is applied 1440 to adjust one or more control outputs of the autonomous electronic bicycle to achieve the target pose from the current state. The output of the neural network is refined 1450 by a set of heuristic rules and the refined control outputs are used to control 1460 the autonomous bike hardware.

Conclusion

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. An electronic bicycle, comprising:
a frame;
a set of pedals comprising a pedal motor configured to apply a torque to the set of pedals;
a processor; and
a non-transitory, computer-readable medium storing instructions that, when executed by the processor, cause the processor to:
receive a pedal signal from the set of pedals describing pedaling by a rider of the electronic bicycle;
determine a first torque applied to the set of pedals by the rider of the electronic bicycle based on the pedal signal;
determine a virtual resistance to apply to the set of pedals, wherein the virtual resistance comprises a second torque applied to the set of pedals by the pedal motor, and wherein the second torque is determined based on a virtual gear of the electronic bicycle; and
apply the second torque to the set of pedals by the pedal motor.

2. The electronic bicycle of claim 1, further comprising a wheel coupled to a hub motor, and wherein the computer-readable medium further stores instructions that cause the processor to:
apply a third torque to the wheel by the hub motor, wherein the third torque is based on the virtual gear of the electronic bicycle.

3. The electronic bicycle of claim 2, wherein the third torque is based on the pedaling by the rider of the electronic bicycle.

4. The electronic bicycle of claim 1, wherein the virtual gear is based on an aid term selected by the rider.

5. The electronic bicycle of claim 4, wherein the computer-readable medium further stores instructions that cause the processor to:
receive a selection from the rider of higher aid term; and
apply a third torque to the set of pedals by the pedal motor based on the higher aid term, wherein the third torque has a lesser magnitude than the second torque.

6. The electronic bicycle of claim 4, wherein the computer-readable medium further stores instructions that cause the processor to:
receive a selection from the rider of lower aid term; and
apply a third torque to the set of pedals by the pedal motor based on the lower aid term, wherein the third torque has a greater magnitude than the second torque.

7. The electronic bicycle of claim 1, wherein applying the second torque to the set of pedals by the pedal motor comprises:
converting mechanical power exerted by the rider through the pedaling into electrical power by the pedal motor; and
providing the electrical power to a power source of the electronic bicycle.

8. The electronic bicycle of claim 7, wherein providing the electrical power to the power source comprises adjusting an electrical current drawn by the power source based on the virtual gear.

9. The electronic bicycle of claim 1, wherein the computer-readable medium further stores instructions that, when executed by the processor, cause the processor to:
detect a change in current incline of the electronic bicycle; and
responsive to detecting the change in current incline, apply a third torque to the set of pedals by the pedal motor based on the change in current incline.

10. The electronic bicycle of claim 1, wherein the virtual gear is one of a set of predetermined virtual gears.

11. A non-transitory, computer-readable medium storing instructions that, when executed by a processor, cause the processor to:
receive a pedal signal from a set of pedals of an electronic bicycle, wherein the set of pedals comprises a pedal motor configured to apply a torque to the set of pedals, and wherein the pedal signal describes pedaling by a rider of the electronic bicycle;
determine a first torque applied to the set of pedals by the rider of the electronic bicycle based on the pedal signal;
determine a virtual resistance to apply to the set of pedals, wherein the virtual resistance comprises a second torque applied to the set of pedals by the pedal motor, and wherein the second torque is determined based on a virtual gear of the electronic bicycle; and
apply the second torque to the set of pedals by the pedal motor.

12. The computer-readable medium of claim 11, further storing instructions that cause a processor to:

apply a third torque to a wheel of the electronic bicycle by a hub motor, wherein the third torque is based on the virtual gear of the electronic bicycle.

13. The computer-readable medium of claim 12, wherein the third torque is based on the pedaling by the rider of the electronic bicycle.

14. The computer-readable medium of claim 11, wherein the virtual gear is based on an aid term selected by the rider.

15. The computer-readable medium of claim 14, further storing instructions that cause a processor to:
   receive a selection from the rider of higher aid term; and
   apply a third torque to the set of pedals by the pedal motor based on the higher aid term, wherein the third torque has a lesser magnitude than the second torque.

16. The computer-readable medium of claim 14, further storing instructions that cause a processor to:
   receive a selection from the rider of lower aid term; and
   apply a third torque to the set of pedals by the pedal motor based on the lower aid term, wherein the third torque has a greater magnitude than the second torque.

17. The computer-readable medium of claim 11, wherein applying the second torque to the set of pedals by the pedal motor comprises:
   converting mechanical power exerted by the rider through the pedaling into electrical power by the pedal motor; and
   providing the electrical power to a power source of the electronic bicycle.

18. The computer-readable medium of claim 17, wherein providing the electrical power to the power source comprises adjusting an electrical current drawn by the power source based on the virtual gear.

19. The computer-readable medium of claim 11, further storing instructions that, when executed by the processor, cause the processor to:
   detect a change in current incline of the electronic bicycle; and
   responsive to detecting the change in current incline, apply a third torque to the set of pedals by the pedal motor based on the change in current incline.

20. The computer-readable medium of claim 11, wherein the virtual gear is one of a set of predetermined virtual gears.

* * * * *